United States Patent
Dou et al.

(10) Patent No.: US 11,417,883 B2
(45) Date of Patent: Aug. 16, 2022

(54) POSITIVE ELECTRODE ACTIVE MATERIAL, PREPARATION METHOD THEREOF, POSITIVE ELECTRODE PLATE, LITHIUM-ION SECONDARY BATTERY AS WELL AS BATTERY MODULE, BATTERY PACK AND APPARATUS CONTAINING LITHIUM-ION SECONDARY BATTERY

(71) Applicant: Contemporary Amperex Technology Co., Limited, Ningde (CN)

(72) Inventors: Shushi Dou, Ningde (CN); Chunhua Hu, Ningde (CN); Yao Jiang, Ningde (CN); Qi Wu, Ningde (CN); Jinhua He, Ningde (CN); Bin Deng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/565,450

(22) Filed: Dec. 29, 2021

(65) Prior Publication Data

US 2022/0123302 A1 Apr. 21, 2022

Related U.S. Application Data

(63) Continuation of application No. PCT/CN2020/109843, filed on Aug. 18, 2020.

(30) Foreign Application Priority Data

Sep. 2, 2019 (CN) .......................... 201910845573.7

(51) Int. Cl.
 *H01M 4/525* (2010.01)
 *H01M 4/04* (2006.01)
 (Continued)

(52) U.S. Cl.
 CPC ......... *H01M 4/525* (2013.01); *H01M 4/0404* (2013.01); *H01M 4/131* (2013.01);
 (Continued)

(58) Field of Classification Search
 None
 See application file for complete search history.

(56) References Cited

U.S. PATENT DOCUMENTS

2018/0123128 A1    5/2018  Kang et al.

FOREIGN PATENT DOCUMENTS

| CN | 101107735 A | 1/2008 |
|---|---|---|
| CN | 103259008 A | 8/2013 |

(Continued)

OTHER PUBLICATIONS

The International search report for PCT Application No. PCT/CN2020/109843, dated Nov. 6, 2020, 14 pages.

(Continued)

*Primary Examiner* — Carlos Barcena
(74) *Attorney, Agent, or Firm* — Law Offices of Liaoteng Wang

(57) ABSTRACT

The present application discloses positive electrode active material, preparation method thereof, positive electrode plate, lithium-ion secondary battery and battery module, pack, and apparatus. The positive electrode active material includes a nickel-containing lithium composite oxide satisfying a chemical formula $Li_{1+a}[Ni_xCo_yMn_zM_b]O_2$, in the formula, M is a doping element at transition metal site, $0.5 \leq x < 1$, $0 \leq y < 0.3$, $0 \leq z < 0.3$, $-0.1 \leq a < 0.2$, $0 < b < 0.3$, $x+y+z+b=1$, wherein the positive electrode active material has a layered crystal structure and belongs to space group $R\bar{3}m$; under the condition that the positive electrode active material is in 78% delithiation state, at least part of the doping elements M have a chemical valence of +3 or more, and (Continued)

CP image of element distribution

Example 1 surface oxygen of the positive electrode active material has an average valence state of $V_O$ satisfying $-2.0 \leq V_O \leq -1.5$.

20 Claims, 4 Drawing Sheets

(51) Int. Cl.
    *H01M 4/131*     (2010.01)
    *H01M 10/0525*     (2010.01)
    *H01M 4/02*     (2006.01)

(52) U.S. Cl.
    CPC .. *H01M 10/0525* (2013.01); *H01M 2004/021* (2013.01); *H01M 2004/028* (2013.01)

(56) References Cited

FOREIGN PATENT DOCUMENTS

| | | | |
|---|---|---|---|
| CN | 105702952 | A | 6/2016 |
| CN | 107732234 | A | 2/2018 |
| CN | 108550822 | A | 9/2018 |
| CN | 109192972 | A | 1/2019 |
| CN | 109461926 | A | 3/2019 |

OTHER PUBLICATIONS

The First Office Action for China Application No. 201910845573.7, dated Jul. 6, 2021, 9 pages.

The Rejection Decision for China Application No. 201910845573.7, dated Sep. 14, 2021, 5 pages.

Zhifeng Li et al. "Effects of Nb substitution on structure and electrochemical properties of LiNi0.7Mi0.3O2 cathode materials" Journal of Solid State Electrochemistry. vol. 22, No. 9, May 23, 2018 (May 23, 2018 ), ISSN: 1432-8488. pp. 2812-2813.

The Notice of Reexamination for Chinese Application No. 201910845573.7, dated Apr. 13, 2022, 10 pages.

The extended European search report for European Application No. 20860638.4, dated May 10, 2022, 7 pages.

Aziam H. et al.:"Understanding the electrochemical lithiation/delithiation process in the anode material for lithium ion batteries NiFeOPO4/C using ex-situ X-ray absorption near edge spectroscopy and in-situ synchrotron X-ray", dated Sep. 1, 2018, 7 pages.

Ping Cui et al.:"Preparation and characteristics of Sb-doped LiNiO2 cathode materials for Li-ion batteries",dated Apr. 22, 2011, 5 pages.

Yike Lei et al.:"Nb-doping in LiNio.SCoo.iMn0.i O2 cathode material: Effect on the cycling stability and voltage decay at high rates",dated Feb. 8, 2019, 9 pages.

CP image of element distribution

POSITIVE ELECTRODE ACTIVE MATERIAL, PREPARATION METHOD THEREOF, POSITIVE ELECTRODE PLATE, LITHIUM-ION SECONDARY BATTERY AS WELL AS BATTERY MODULE, BATTERY PACK AND APPARATUS CONTAINING LITHIUM-ION SECONDARY BATTERY

CROSS-REFERENCES TO RELATED APPLICATIONS

This application is a continuation of International Application No. PCT/CN2020/109843, filed on Aug. 18, 2020, which claims priority to Chinese Patent Application No. 201910845573.7, titled "POSITIVE ELECTRODE ACTIVE MATERIAL, POSITIVE ELECTRODE PLATE, AND LITHIUM-ION SECONDARY BATTERY" and filed on Sep. 2, 2019, both of which are incorporated herein by reference in their entireties.

TECHNICAL FIELD

This application belongs to the technical field of secondary batteries, and particularly relates to a positive electrode active material, a preparation method thereof, a positive electrode plate, a lithium-ion secondary battery as well as a battery pack, an apparatus and a battery module containing the lithium-ion secondary battery.

BACKGROUND

Lithium-ion secondary battery is a kind of rechargeable batteries, which mainly rely on the movement of lithium ions between the positive electrode and the negative electrode to work, and is currently a widely used clean energy. As an important part of a lithium-ion secondary battery, a positive electrode active material provides lithium ions that move back and forth between the positive electrode and the negative electrode for the charging and discharging processes of the battery. Therefore, the positive electrode active material is very important to the performance of the battery.

Lithium-nickel-based positive electrode active materials have a relatively high theoretical capacity, and a lithium-ion secondary battery using lithium-nickel-based positive electrode active materials may be expected to obtain relatively high energy density, but research has found that such lithium-ion secondary battery exhibits poor high-temperature cycling performance.

SUMMARY

A first aspect of the present application provides a positive electrode active material, including a nickel-containing lithium composite oxide satisfying a chemical formula $Li_{1+a}[Ni_xCo_yMn_zM_b]O_2$, in the formula, M is a doping element at transition metal site, $0.5 \le x < 1$, $0 \le y < 0.3$, $0 \le z < 0.3$, $-0.1 \le a < 0.2$, $0 < b < 0.3$, $x+y+z+b=1$, wherein the positive electrode active material has a layered crystal structure and belongs to space group R$\bar{3}$m; under the condition that the positive electrode active material is in 78% delithiation state, at least part of the doping elements M have a chemical valence of +3 or more, and surface oxygen of the positive electrode active material has an average valence state of $V_O$ satisfying $-2.0 \le V_O \le -1.5$.

The positive electrode active material provided by this application includes a nickel-containing lithium composite oxide with a specific chemical composition and structure, so that the positive electrode active material has relatively high charge/discharge voltage and specific capacity characteristics, and a lithium-ion secondary battery using the positive electrode active material can exhibit relatively high capacity performance and energy density. The positive electrode active material also includes a doping element M. When the positive electrode active material is in 78% delithiation state, at least part of the doping elements M have a chemical valence of +3 or more. Through the modification by doping with M element, the difference between the valence state $V_O$ of the surface oxygen of the positive electrode active material in 78% delithiation state and the chemical valence (−2) of ground-state oxygen is within a small range, which can significantly improve structural stability of the positive electrode active material, and reduce surface side reactions, thereby significantly improving high-temperature cycling performance of the battery. Therefore, by using the positive electrode active material of the present application, both relatively high energy density and good high-temperature cycling performance of the lithium-ion secondary battery can be achieved.

In any embodiments as described above, $0.7 \le x \le 0.9$, $0 \le y < 0.3$, $0 \le z < 0.3$; and the average valence state $V_O$ of surface oxygen of the positive electrode active material in 78% delithiation state may be $-1.9 \le V_O \le -1.6$. By using such positive electrode active material, the battery has relatively high energy density and high-temperature cycling performance.

In any embodiments as described above, the positive electrode active material may include secondary particles aggregated from primary particles, and the relative deviation of local mass concentration of the doping element M in the secondary particles may be 32% or less, and optionally 20% or less. Relatively uniform distribution of doping elements in the secondary particles can effectively reduce the activity of surface oxygen of the positive electrode active material and increase oxygen defect formation energy in bulk structure of the positive electrode active material, thereby improving overall performance of the battery. The battery can have, among others, relatively higher energy density and high-temperature cycling performance.

In any embodiments as described above, the positive electrode active material in 78% delithiation state may have a bulk structure with oxygen defect formation energy $\Delta E_{O-vac}$, satisfying: $\Delta E_{O-vac} \ge 0.5$ eV; optionally, $\Delta E_{O-vac} \ge 0.7$ eV; optionally, $\Delta E_{O-vac} \ge 1.0$ eV. By using $\Delta E_{O-vac}$ within the above ranges, the positive electrode active material can have relatively high structural stability which ensures that a good carrier for the intercalation and deintercalation of lithium ions, thereby obtaining a relatively high initial capacity and cycle capacity retention rate and thus improving energy density and high-temperature cycling performance of the battery.

In any embodiments as described above, when the positive electrode active material is in 78% delithiation state, the doping element M may have two or more different valence states, and the chemical valence of the doping element M in the highest valence state may be one or more of +4, +5, +6, +7, and +8; optionally one or more of +5, +6, +7, and +8. The doping element M may contribute more electrons to the positive electrode active material, which may further reduce the activity of surface oxygen of the positive electrode active material, stabilize the material structure, and reduce surface side reactions, thereby further improving the high-temperature cycling performance of the battery. In addition, the doping element M may bind oxygen atoms more effectively, thereby increasing the oxygen defect formation energy $\Delta E_{O\text{-}vac}$ of the positive electrode active material and improving structural stability.

In any embodiments as described above, the doping element M may include one or more of Ti, V, Se, Zr, Nb, Ru, Pd, Sb, Te, and W. Optionally, the doping element M may include one or more of Ti, Se, Zr, Nb, Ru, Sb, Te, and W. The given doping element M can better improve the energy density and high-temperature cycling performance of the lithium-ion secondary battery.

In any embodiments as described above, the positive electrode active material may have a true doping concentration w satisfying 2300 µg/cm³≤ω≤49100 µg/cm³, optionally 3000 µg/cm³≤ω≤30000 µg/cm³, optionally 14830 µg/cm³≤ω≤49080 µg/cm³, optionally 24890 µg/cm³≤ω≤31210 µg/cm³. By using the positive electrode active material having true doping concentration within the above ranges, the activity of surface oxygen of the positive electrode active material may be effectively reduced and the oxygen defect formation energy in the bulk structure may be improved, and the particles may have a relatively high ability of transmission and diffusion of lithium ions, thereby improving energy density and high-temperature cycling performance of the battery.

In any embodiments as described above, the deviation ε of the mass concentration of the doping element M in the positive electrode active material relative to the average mass concentration of the doping element M in the particles of the positive electrode active material may satisfy ε<50%; optionally, ε≤30%; and optionally, ε≤20%. By using the positive electrode active material having ε within the above ranges, the positive electrode active material may have relatively good macroscopic and microscopic consistency and relatively high overall stability of the particles, which is conducive to obtaining higher capacity and high-temperature cycling performance, thereby improving the corresponding performance of the battery.

In any embodiments as described above, the positive electrode active material may have true density $\rho_{true}$ satisfying 4.6 g/cm³≤$\rho_{true}$≤4.9 g/cm³. Such positive electrode active material can have a relatively high specific capacity, which can increase the energy density of the battery.

In any embodiments as described above, the positive electrode active material may have a volume average particle diameter $D_v50$ of from 5 µm to 20 µm, optionally from 8 µm to 15 µm, and further optionally from 9 µm to 11 µm. By using the positive electrode active material having $D_v50$ within the above ranges, cycling performance and rate performance of the lithium-ion secondary battery can be improved, and energy density of the battery can also be improved.

In any embodiments as described above, the positive electrode active material may have a specific surface area of from 0.2 m²/g to 1.5 m²/g, optionally from 0.3 m²/g to 1 m²/g. By using the positive electrode active material having specific surface area within the above ranges, relatively high energy density and cycling performance of the battery can be obtained.

In any embodiments as described above, the positive electrode active material may have a tap density of from 2.3 g/cm³ to 2.8 g/cm³. By using the positive electrode active material having tap density within the above range, the lithium-ion secondary battery may have a relatively high energy density.

In any embodiments as described above, the positive electrode active material may have a compaction density under a pressure of 5 tons (equivalent to 49 kN) of from 3.1 g/cm³ to 3.8 g/cm³. By using the positive electrode active material having compaction density within the above range, a relatively high energy density of the lithium-ion secondary battery can be obtained.

A second aspect of the present application provides a method for preparing the positive electrode active material, including the following steps:

mixing a positive electrode active material precursor, a lithium source and a doping element precursor to obtain a mixed material, wherein the positive electrode active material precursor is selected from one or more of hydroxides, carbonates and oxides containing Ni, optional Co and optional Mn;

sintering the mixed material in an oxygen-containing atmosphere at a temperature of from 600° C. to 1000° C., to obtain the positive electrode active material;

wherein, the positive electrode active material includes a nickel-containing lithium composite oxide, and the nickel-containing lithium composite oxide satisfies the chemical formula $Li_{1+a}[Ni_xCo_yMn_zM_b]O_2$ in which M is a doping element at transition metal site, 0.5≤x<1, 0≤y<0.3, 0≤z<0.3, −0.1≤a<0.2, 0<b<0.3, x+y+z+b=1;

the positive electrode active material has a layered crystal structure and belongs to space group R$\bar{3}$m;

under the condition that the positive electrode active material is in 78% delithiation state, at least part of the doping elements M have a chemical valence of +3 or more, and surface oxygen of the positive electrode active material has an average valence state of $V_O$ is −2.0≤$V_O$≤−1.5.

The positive electrode active material obtained by the preparation method provided in this application includes a nickel-containing lithium composite oxide that is doped with an element M at the transition metal site, and under the condition that the positive electrode active material is in 78% delithiation state, at least part of the doping elements M have a chemical valence of +3 or more, and the difference between the valence state $V_O$ of surface oxygen of the positive electrode active material and the chemical valence (−2) of ground-state oxygen is within a small range, thereby enabling a lithium-ion secondary battery having both higher energy density and high-temperature cycling performance.

In any of the above embodiments, the doping element precursor may be selected from one or more of titanium oxide, vanadium oxide, selenium oxide, zirconium oxide, niobium oxide, ruthenium oxide, palladium oxide, antimony oxide, tellurium oxide, and tungsten oxide. Optionally, the doping element precursor may be selected from one or more of $TiO_2$, TiO, $V_2O_5$, $V_2O_4$, $V_2O_3$, $SeO_2$, $ZrO_2$, $Nb_2O_5$, $NbO_2$, $RuO_2$, PdO, $Sb_2O_5$, $Sb_2O_3$, $TeO_2$, $WO_2$, and $WO_3$.

In any of the foregoing embodiments, the sintering may satisfy at least one of the following:

oxygen concentration of the oxygen-containing atmosphere is from 80% to 100%;

the temperature for sintering is from 600° C. to 900° C., optionally from 700° C. to 900° C.; and the time for sintering is from 5 h to 25 h, optionally from 10 h to 20 h.

In any of the above embodiments, the doping element precursor may be equally or randomly divided into L parts for L batches of doping, wherein L is from 1 to 5, optionally from 2 to 3. The embodiments including: the positive electrode active material precursor, lithium source and first batch of doping element precursor is mixed, followed by first sintering process; the product obtained from the first sintering process is mixed with the second batch of doping element precursor, followed by second sintering process; and so on, until the product obtained from L−1 sintering process is mixed with the L batch of doping element precursor, followed by L-th sintering treatment, to obtain a positive electrode active material.

Optionally, the temperature for each of sintering processes may be from 600° C. to 1000° C., optionally from 600° C. to 900° C., and further optionally is from 700° C. to 900° C.; the time of each of sintering processes may be from 1 h to 20 h, optionally from 2 h to 18 h; the total time for sintering may be from 5 h to 25 h, optionally from 10 h to 20 h.

A third aspect of the present application provides a positive electrode plate, including a positive current collector and a positive electrode active material layer disposed on the positive current collector, wherein the positive electrode active material layer includes the positive electrode active material of the first aspect of the present application, or the positive electrode active material obtained according to the method in the second aspect of the present application.

Since the positive electrode plate of the present application contains the positive electrode active material described herein, the lithium-ion secondary battery containing the positive electrode plate can have relatively high energy density and high-temperature cycling performance.

A fourth aspect of the present application provides a lithium-ion secondary battery, including the positive electrode plate according to the third aspect of the present application.

Since the lithium-ion secondary battery of the present application includes the positive electrode plate, it can have relatively high energy density and high-temperature cycling performance.

A fifth aspect of the present application provides a battery module, including the lithium-ion secondary battery of the fourth aspect of the present application.

A sixth aspect of the present application provides a battery pack, including the lithium-ion secondary battery of the fourth aspect of the present application or the battery module of the fifth aspect of the present application.

A seventh aspect of the present application provides an apparatus, including at least one of the lithium-ion secondary battery of the fourth aspect of the present application, the battery module of the fifth aspect of the present application, or the battery pack of the sixth aspect of the present application.

The battery module, battery pack, and apparatus of the present application include the lithium-ion secondary battery of the present application, and thus have at least the same or similar effects as the lithium-ion secondary battery.

BRIEF DESCRIPTION OF DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the drawings without creative work.

DETAILED DESCRIPTION

Figure 1:
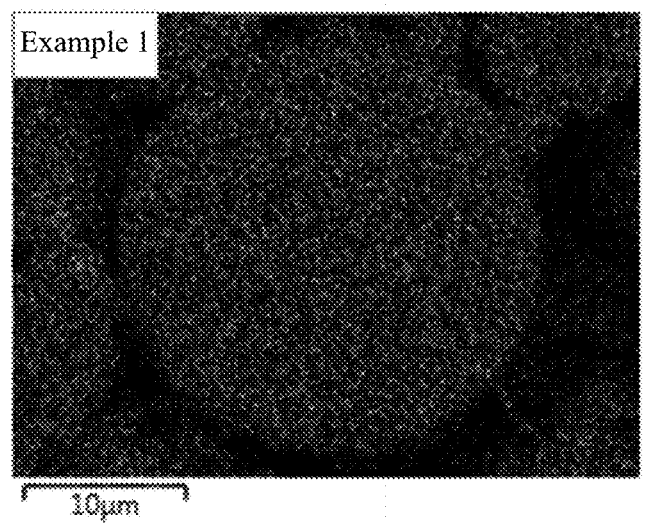
FIG. 1 is an image showing the distribution of doping element in secondary particles of the positive electrode active material of Example 1, obtained by preparing a cross section with IB-09010CP type Cross Section Polisher (CP) available from JEOL, and testing with X-Max Energy Dispersive Spectroscopy (EDS) Detector available from Oxford Instruments; in which bright spots in the image indicate the doping elements, and the doping elements are evenly distributed in the particles.

In order to make the object, technical solutions, and technical effects of the present application clearer, the following further describes the present application in details with reference to the embodiments. It should be understood that the embodiments described in the present description are merely used to illustrate the present application, but not intended to limit the present application.

For the sake of brevity, only certain numerical ranges are explicitly disclosed herein. However, any lower limit may be combined with any upper limit to form a range that is not explicitly described; and any lower limit may be combined with other lower limit to form an unspecified range; and any upper limit may be combined with any other upper limit to form an unspecified range. Further, although not explicitly specified, each point or single value between the endpoints of a range is included in the range. Thus, each point or single value can be combined with any other point or single value or combined with other lower or upper limits to form a range that is not explicitly specified.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

In the description herein, unless otherwise stated, the term "or" is inclusive. For example, the phrase "A or B" means "A, B, or both A and B." More specifically, any of the following conditions satisfy the condition "A or B": A is true (or exists) and B is false (or does not exist); A is false (or does not exist) and B is true (or exists); or both A and B are true (or exist).

The above summary of the present application is not intended to describe each disclosed embodiment or every implementation in this application. The following description illustrates exemplary embodiments more specifically. In many places throughout the application, guidance is provided through a series of examples, which can be used in various combinations. In each embodiment, the enumeration is only a representative group and should not be interpreted as exhaustive.

Positive Electrode Active Material

The positive electrode active material of the first aspect of the present application comprises a nickel-containing lithium composite oxide satisfying the chemical formula $Li_{1+a}[Ni_xCo_yMn_zM_b]O_2$, wherein M is a doping element at transition metal site, $0.5 \leq x < 1$, $0 \leq y < 0.3$, $0 \leq z < 0.3$, $-0.1 \leq a < 0.2$, $0 < b < 0.3$, $x+y+z+b=1$; the positive electrode active material has a layered crystal structure and belongs to space group R$\bar{3}$m; under the condition that the positive electrode active material is in 78% delithiation state, at least part of the doping elements M have a chemical valence of +3 or more, and surface oxygen of the positive electrode active material has an average valence state of $V_O$ satisfying $-2.0 \leq V_O \leq -1.5$.

As used herein, "78% delithiation state" refers to the state in which a molar content of lithium deintercalated from the positive electrode active material is 78% of the theoretical lithium content during charging process of the battery. In the actual use of secondary battery, a "fully charged state" is generally set, and a corresponding "charge cut-off voltage" is set to ensure the safe use of a battery. "Fully charged state" means that the state of charge (SOC) of secondary battery is 100%. In other words, the secondary battery comprising the positive electrode comprising the above-mentioned positive electrode active material is charged to the charge cut-off voltage within the range of reversible charging and discharging. The "fully charged state" or "charge cut-off voltage" may have certain differences due to different positive electrode active material or different safety requirements. When the secondary battery made of positive electrode active material comprising nickel-containing lithium composite oxide is in the "fully charged state", the delithiation state of the positive electrode active material is generally around "78% delithiation state" to ensure normal use.

In the present application, the positive electrode active material in the "78% delithiation state" is studied, in combination with corresponding relationship between the "delithiation state" and the charging voltage. Specifically, a series of batteries using the positive electrode active material will be charged at a rate of 0.1 C to 2.8V, 2.9V, 3.0V, 3.1V, 3.2V, 3.3V, ... 4.0V, 4.1V, 4.2V, 4.3V, 4.4V, and 4.5V (that is, the charging voltage interval is 0.1V), respectively; then the positive electrode plate of the battery is taken out and washed for removing electrolyte; the positive electrode active material is digested; and by using the inductively coupled plasma-Optical Emission spectrometers (ICP-OES), mass concentration of Li, transition metals, and O elements of the positive electrode active material are tested; the stoichiometric ratios of elements of the positive electrode active material at the charging voltage are calculated; and after conversion, the chemical formula of the positive electrode active material at the charging voltage is obtained; and thus the charging voltage corresponding to the "78% delithiation state" is obtained.

The battery containing the positive electrode active material to be tested is charged to the voltage corresponding to the "78% delithiation state", and then disassembled to obtain the positive electrode active material in the "78% delithiation state" for further study. Valence state $V_O$ of surface oxygen of the "78% delithiation state" positive electrode active material and chemical valence of the doping element M can be obtained by X-ray photoelectron spectroscopy (XPS) test. More accurately, it can be obtained through synchrotron radiation photoelectron spectroscopy (SRPES) test.

The positive electrode active material of the embodiments of this application comprises a nickel-containing lithium composite oxide with a specific chemical composition and structure, so that the positive electrode active material has relatively high charge/discharge voltage and specific capacity characteristics, and a lithium-ion secondary battery using the positive electrode active material can exhibit relatively high capacity performance and energy density.

The positive electrode active material that has not been delithiated has a relatively low chemical valence (such as −2) of surface oxygen, and during delithiation process of the positive electrode active material (during charging of battery), as the lithium ions are deintercalated from the positive electrode active material, electrons in the positive electrode active material are continuously deintercalated to arrive at the negative electrode. The positive electrode active material also includes a doping element M. When the positive electrode active material is in 78% delithiation state, part of or all of the doping elements M have a chemical valence of +3 or more. The doping element M with higher chemical valence can contribute more electrons in the positive electrode active material, and correspondingly, the number of electrons lost by oxygen atoms of the positive electrode active material will be reduced, which maintains the activity of surface oxygen of the positive electrode active material during and after the delithiation always at a relatively low level, especially average valence state $V_O$ of the surface oxygen of the positive electrode active material in 78% delithiation state being from −2.0 to −1.5.

Through the modification by doping with the M element, the valence state $V_O$ of surface oxygen of the positive electrode active material in 78% delithiation state has a small difference with the ground-state oxygen chemical valence (−2), which can significantly improve the structural stability of the positive electrode active material, so that the positive electrode active material is not prone to release oxygen during heating and high temperature cycling, thereby inhibiting oxygen defects, and effectively preventing the positive electrode active material from irreversible phase transition and thus increasing the capacity retention rate of the positive electrode active material during high temperature cycle. Therefore, in this application, the high-temperature cycling performance of the battery can be significantly improved by doping with the M element at the transition metal site of the nickel-containing lithium composite oxide. In addition, thermal stability and high-temperature safety performance of the battery may also be improved.

Low activity of surface oxygen of the positive electrode active material can also effectively inhibit side reactions of the electrolyte on the surface of material particles, inhibit gas production, reduce heat generation, and reduce the consumption of reversible lithium ions, inhibit the increase of positive electrode impedance, and reduce the polarization of positive electrode, and thus is beneficial to improving high temperature cycling performance of the battery.

By using the positive electrode active material of embodiments of the present application, capacity performance, energy density and high-temperature cycling performance of the lithium-ion secondary battery may be all improved.

In some optional embodiments, mole percentage of nickel in elements at the transition metal site of the nickel-containing lithium composite oxide may be from 50% to 90%, for example, from 70% to 90%. This high-nickel positive electrode active material can have a relatively high specific capacity, and can improve capacity performance and energy density of the battery.

Optionally, in the chemical formula of the nickel-containing lithium composite oxide, $0.7 \leq x \leq 0.9$, $0 < y < 0.3$, $0 < z < 0.3$; and the average valence state $V_O$ of surface oxygen of the positive electrode active material in the "78% delithiation state" may be $-1.9 \leq V_O \leq -1.6$. By using such positive electrode active material, the battery has higher energy density and high-temperature cycling performance.

The doping element M with a chemical valence of +3 or more has a strong binding ability to oxygen, that is, the bond energy with oxygen is large, which can effectively bind oxygen atoms, so that the positive electrode active material is not prone to release oxygen during heating and high temperature cycling and the oxygen defect formation energy $\Delta E_{O\text{-}vac}$ of the positive electrode active material is increased. In some embodiments, the positive electrode active material has a bulk structure in 78% delithiation state in which oxygen defect formation energy $\Delta E_{O\text{-}vac}$ satisfies $\Delta E_{O\text{-}vac} \geq 0.5$ eV. Optionally, $\Delta E_{O\text{-}vac} \geq 0.7$ eV. Optionally, $\Delta E_{O\text{-}vac} \geq 1.0$ eV.

The positive electrode active material has a bulk structure in a "78% delithiation state" in which oxygen defect formation energy $\Delta E_{O\text{-}vac}$ satisfies Formula (1).

$$\Delta E_{O\text{-}vac} = E_{pristine} - E_{defect} - E_O \quad \text{Formula 1}$$

In Formula (1), $\Delta E_{O\text{-}vac}$ represents the oxygen defect formation energy of the bulk structure in the "78% delithiation state" of the positive electrode active material in the ground state; $E_{pristine}$ represents the energy of bulk structure of the positive electrode active material with a complete structure in the ground state in "78% delithiation state"; $E_{defect}$ represents the energy of bulk structure in the "78% delithiation state" of the positive electrode active material with oxygen defects in the ground state; $E_O$ represents the energy (chemical potential) of the oxygen atom in the ground state.

$E_{pristine}$, $E_{defect}$ and $E_O$ all can be calculated by the first-principles calculation software VASP based on Density Functional Theory. The exchange-correlation functional can be obtained by using Generalized Gradient Approximation (GGA) plus a Hubbard parameter U, namely GGA+U exchange-correlation Functional. As an example, the following steps can be included:

S10, based on the X-ray diffraction (XRD) analysis results of positive electrode active material in the "78% delithiation state", obtaining the unit cell parameters, element occupancy and other information of the positive electrode active material in the "78% delithiation state"; based on these, constructing a bulk structure model of the positive electrode active material with a complete structure in the "78% delithiation state", wherein its structure satisfies space group R3̄m; using first-principles calculation software VASP based on Density Functional Theory and GGA+U exchange-correlation functional for structural optimization of the model until energy convergence is reached; extracting the optimized structure energy, denoted as $E_{pristine}$.

S20, on the basis of the optimized bulk structure model of positive electrode active material in "78% delithiation state", subtracting one oxygen atom to obtain a bulk model of the positive electrode active material with oxygen defects in the "78% delithiation state"; using the first-principles calculation software VASP based on Density Functional Theory and the GGA+U exchange-correlation functional to optimize the structure of the model of oxygen defect-containing bulk until energy convergence is reached; and extracting the optimized structure energy, denoted as $E_{defect}$.

S30, using the first-principles calculation software VASP based on Density Functional Theory and GGA+U exchange-correlation functional to optimize oxygen molecules until energy convergence is reached; extracting the optimized oxygen energy and dividing it by 2, denoted as $E_O$.

S40, substituting the values of $E_{pristine}$, $E_{defect}$ and $E_O$ into Formula (1), and calculating the oxygen defect formation energy of single oxygen atom.

Referring to step S20, the defect formation energy of different oxygen atoms may be obtained by subtracting different oxygen atoms, and the minimum value is used as the oxygen defect formation energy $\Delta E_{O\text{-}vac}$ of bulk structure of the positive electrode active material in "78% delithiation state".

In the calculation process of the above steps S10, S20, and S30, the accuracy of the calculation parameters used ensures that the structural energy after the optimization calculation converges to less than $10^{-6}$ eV and force converges to less than $-0.005$ eV/Å, thereby ensuring more reliable calculation results.

By using oxygen defect formation energy $\Delta E_{O\text{-}vac}$ of bulk structure of positive electrode active material in "78% delithiation state" within the above ranges, oxygen atoms in the positive electrode active material will not easily deviate from the original lattice position to form oxygen defects during the charging process and in the fully charged state, so that the positive electrode active material has high structural stability and is always kept in a layered phase state with strong electrochemical activity, thereby providing a good carrier for deintercalation and intercalation of lithium ions. By doing so, the positive electrode active material has a higher initial capacity and cycle capacity retention rate, thereby improving the energy density and high temperature cycling performance of the battery.

By using oxygen defect formation energy $\Delta E_{O\text{-}vac}$ of bulk structure of positive electrode active material in "78% delithiation state" within the above ranges, the positive electrode active material is not prone to release oxygen during heating and high-temperature cycling, which is beneficial to improving the thermal stability and high-temperature safety performance of the battery.

In some optional embodiments, in the positive electrode active material in 78% delithiation state, the doping element M has two or more different valence states, and the chemical valence of the M element in the highest valence state is one or more of +4, +5, +6, +7, and +8. Optionally, in the positive electrode active material in 78% delithiation state, the highest valence state of the M element is one or more of +5, +6, +7, and +8. The doping element M that has relatively high valence state with variability can contribute more electrons to the positive electrode active material, and correspondingly, the number of electrons lost by oxygen atoms of the positive electrode active material will be less, which may further reduce the activity of surface oxygen of the positive electrode active material, stabilize the structure of the material, and reduce surface side reactions, and further improve the high-temperature cycling performance of the battery. In addition, the doping element having relatively high valence state has a strong ability of binding to oxygen and thus can bind oxygen atoms more effectively, thereby increasing the oxygen defect formation energy $\Delta E_{O\text{-}vac}$ and improving structural stability of the positive electrode active material and further improving the performance of battery.

In addition, when the positive electrode active material is in 78% delithiation state, the doping element M has two or more different valence states, and the doping element having relatively low valence state can further contribute electrons to support the release of more lithium ions from the positive electrode, thereby further increasing the energy density of the battery.

Optionally, the doping element M includes one or more of Ti, V, Se, Zr, Nb, Ru, Pd, Sb, Te, and W. Optionally, the doping element M includes one or more of Ti, Se, Zr, Nb, Ru, Sb, Te, and W. Using a suitable doping element M can better provide the above effects, and further improve energy density and high temperature cycling performance of the lithium-ion secondary battery.

In some optional embodiments, the positive electrode active material includes secondary particles formed by aggregation of primary particles. Furthermore, the relative deviation of local mass concentration of doping element in secondary particles is 32% or less, optionally 30% or less, and further optionally 20% or less, 16% or less, 13% or less, 11% or less, or 10% or less.

In this application, the local mass concentration of doping element in secondary particles is mass concentration of doping element in all elements within the finite volume element at any selected location in the secondary particles, which can be obtained by EDX (Energy Dispersive X-Ray Spectroscopy) or EDS element analysis combined with TEM (Transmission Electron Microscope) or SEM (Scanning Electron Microscope) single-point scanning test of element concentration distribution or other similar methods. When EDX or EDS element analysis is combined with TEM or SEM single-point scanning test, the mass concentration of doping element at different locations in secondary particles expressed in peg is respectively denoted as $\eta_1$, $\eta_2$, $\eta_3$, ..., $\eta_n$, wherein n is a positive integer greater than 15.

Average mass concentration of doping elements in secondary particles is mass concentration of doping elements in all elements within single or multiple range of secondary particles, which can be obtained by EDX or EDS element analysis combined with TEM or SEM surface scanning test of element concentration distribution or other similar methods. When the EDX or EDS element analysis is combined with the TEM or SEM surface scanning test of element concentration distribution, the tested surface includes all the points in the above single-point test. Average mass concentration of doping elements in secondary particles is recorded as $\bar{\eta}$, in µg/g.

The relative deviation δ of local mass concentration of doping elements in secondary particles can be calculated according to Formula (2):

$$\sigma = \frac{\max\{|\eta_1 - \bar{\eta}|, |\eta_2 - \bar{\eta}|, |\eta_3 - \bar{\eta}|, \ldots, |\eta_n - \bar{\eta}|\}}{\bar{\eta}} \quad \text{Formula (2)}$$

Secondary particles preferably have σ of 32% or less, optionally 30% or less, and further optionally 20% or less, which means more uniform distribution of doping elements in the secondary particles. Uniform doping may effectively reduce the activity of surface oxygen of the positive electrode active material and increase oxygen defect formation energy in bulk structure of the positive electrode active material, thereby improving overall performance of the battery.

In addition, uniformly doped positive electrode active material particles have consistent properties throughout the particles, the same level of migration and diffusion capacity of lithium ions in different areas within the particles, very close/similar anti-deformation capabilities throughout the particles, and uniform distribution of stress in the particles, thereby improving the structural stability of the positive electrode active material. The secondary particles are not prone to crack, which can prevent side reactions on the exposed fresh surface caused by crack and the deterioration of capacity and cycling performance as a result of that, so that the positive electrode active material has a higher capacity and high-temperature cycle capacity retention rate, thus providing battery with relatively high capacity performance, energy density and high-temperature cycling performance.

The smaller the relative deviation of local mass concentration of doping elements in secondary particles is, the more uniform the distribution of the doping elements in the particles is, the more the structural stability of the positive electrode active material can be improved, and the more the capacity and high-temperature cycling performance of the positive electrode active material can be improved.

In some optional embodiments, the true doping concentration ω in the positive electrode active material satisfies 1500 µg/cm³≤ω≤60000 µg/cm³. Further optionally, 2300 µg/cm³≤ω≤49100 µg/cm³, 3000 µg/cm³≤ω≤30000 µg/cm³, 14830 µg/cm³≤ω≤49080 µg/cm³, 14830 µg/cm³≤ω≤36690 µg/cm³, or 24890 µg/cm³≤ω≤31210 µg/cm³.

In this application, the true doping concentration co in the positive electrode active material may be calculated by Formula (3):

$$\omega = \varphi \times \rho_{true} \quad \text{Formula (3)}$$

In Formula (3), ω is the true doping concentration in the positive electrode active material, in µg/cm³.

$\rho_{true}$ is true density of the positive electrode active material, in g/cm³, and is equal to the ratio of mass of the positive electrode active material to true volume of the positive electrode active material, wherein the true volume is the actual volume of solid material excluding pores inside particles. $\rho_{true}$ can be measured by using well-known instruments and methods in the art, for example, gas volume method, which may be performed with a powder true density tester.

φ is mass concentration of doping element in the positive electrode active material in µg/g, that is, mass of doping element contained in each gram of the positive electrode active material. φ represents the content of doping elements in the overall macroscopic positive electrode active material, including doping element incorporated into the particles of the positive electrode active material, doping element enriched in other phases on the surface of the positive electrode active material particles, and doping element between the particles of the positive electrode active material. φ may be obtained through absorption spectrum of the positive electrode active material solution, such as ICP (Inductive Coupled Plasma Emission Spectrometer), XAFS (X-ray absorption fine structure spectroscopy) and other tests.

By using the positive electrode active material having true doping concentration within the above ranges, the activity of surface oxygen of the positive electrode active material may be effectively reduced and the oxygen defect formation energy in the bulk structure may be increased; and it also makes the positive electrode active material have a good layered crystal structure, ensuring that the positive electrode active material provides a good carrier for deintercalation and intercalation of lithium ions, thus facilitating deintercalation and intercalation of lithium ions and preventing reversible lithium ions from being consumed on the surface of the electrode or in the electrolyte, so that the positive electrode active material has relatively high initial capacity and cycle capacity retention rate and thus improves the energy density and high-temperature cycling performance of the battery.

In addition, by using the positive electrode active material having true doping concentration within the above ranges, it is also ensured that the doping element is incorporated in the transition metal layer, which prevents the doping element from entering the lithium layer, and that the particles have a relatively high ability of transmission and diffusion of lithium ions, so that the battery has a higher capacity and cycling performance.

In some alternative embodiments, the deviation of mass concentration $\varphi$ of doping elements in the positive electrode active material relative to average mass concentration $\overline{\eta}^t$ of doping elements in particles of positive electrode active material is $\varepsilon$, and $\varepsilon$ satisfies $\varepsilon<50\%$. Optionally, $\varepsilon\leq45\%$. Optionally, $\varepsilon\leq30\%$. Further optionally, $\varepsilon\leq20\%$, or $\leq10\%$.

Herein, the particles of the positive electrode active material may include primary particles and/or secondary particles. The average mass concentration of doping elements in primary particles, and average mass concentrations of doping elements in primary particles and secondary particles may be determined, referring to the above average mass concentration $\overline{\eta}$ of doping elements in secondary particles.

The deviation $\varepsilon$ of mass concentration $\varphi$ of doping elements in the positive electrode active material relative to average mass concentration of doping elements in particles concentration $\overline{\eta}^t$ of the positive electrode active material may be calculated by the following Formula (4):

$$\varepsilon = \frac{|\varphi - \overline{\eta}^t|}{\varphi} \quad \text{Formula (4)}$$

It can be understood that when the particles of the positive electrode active material are secondary particles, $\overline{\eta}^t=\overline{\eta}$.

The positive electrode active material satisfying $\varepsilon$ within the above ranges means that the doping elements are smoothly incorporated into the particles of the positive electrode active material, and that the content of doping elements distributed in other phases on the particle surface and the doping elements embedded in the gaps between the particles is less, so that the positive electrode active material has better macro and micro consistency, and uniform structure. During the charge-discharge cycling process, the expansion and contraction of each particle is consistent, and the particle stability is high, which is conducive to its higher capacity and high-temperature cycling performance.

In some optional embodiments, the true density $\rho_{true}$ of the positive electrode active material satisfies 4.6 g/cm³$\leq\rho_{true}\leq$4.9 g/cm³, so that the positive electrode active material can have a higher specific capacity, thereby improving the capacity performance and energy density of the battery.

In embodiments of the application, the volume average particle size $D_v50$ of the positive electrode active material particles may be optionally from 5 μm to 20 μm, further optionally from 8 μm to 15 μm, and optionally from 9 μm to 11 μm. By using positive electrode active material with $D_v50$ within the above ranges, the migration path of lithium ions and electrons in the particles is relatively short, which can improve the transport and diffusion capability of lithium ions and electrons in the positive electrode active material, reduce battery polarization, thereby improving the cycling performance and rate performance of lithium-ion secondary battery; in addition, it can make the positive electrode active material have a higher compaction density, and improve energy density of the battery.

By using positive electrode active material with $D_v50$ within the above ranges, it is also beneficial to reduce side reactions of the electrolyte on the surface of the positive electrode active material, and reduce the agglomeration between the positive electrode active material particles, thereby improving the normal-temperature and high-temperature cycling performance and safety performance of the positive electrode active material.

In any embodiments of the present application, the positive electrode active material may have a specific surface area of optionally from 0.2 m²/g to 1.5 m²/g, further optionally from 0.3 m²/g to 1 m²/g. By using positive electrode active material with specific surface area within the above ranges, it can be ensured that the positive electrode active material has a higher active specific surface area, and at the same time helps to reduce side reactions of the electrolyte on the surface of the positive electrode active material, thereby improving the capacity and cycle life of the positive electrode active material; in addition, it can also inhibit the agglomeration between particles of the positive electrode active material in the process of preparing the slurry and charging and discharging, and improve the energy density and cycling performance of the battery.

In the embodiments of the present application, the positive electrode active material may have a tap density of from 2.3 g/cm³ to 2.8 g/cm³. By using the positive electrode active material having tap density within the above range, the lithium-ion secondary battery may have a relatively high capacity performance and energy density.

In the embodiments of the present application, the positive electrode active material may have a compaction density under a pressure of 5 tons (equivalent to 49 kN) of from 3.1 g/cm³ to 3.8 g/cm³. By using the positive electrode active material having compaction density within the above range, the lithium-ion secondary battery may have relatively high capacity performance and energy density.

Optionally, the positive electrode active material particles provided in the embodiments of the present application may have a morphology of one or more of sphere and spheroid.

In this application, the $D_v50$, also called a median particle size, of the positive electrode active material has well-known meaning in the art, and represents the particle size corresponding to 50% of the volume distribution of particles of the positive electrode active material. The $D_v50$ of the positive electrode active material can be measured with well-known instruments and methods in the art. For example, it can be conveniently measured by using a laser particle size analyzer (such as the Mastersizer 3000 of Malvern Instruments Co., Ltd., UK).

The specific surface area of the positive electrode active material has well-known meaning in the art, and can be measured by instruments and methods known in the art. For example, it can be measured by using the specific surface area analysis test method with nitrogen adsorption and calculated by using the BET (Brunauer Emmett Teller) method. The specific surface area analysis test method with nitrogen adsorption may be carried out by the NOVA 2000e specific surface area and pore size analyzer of Quantachrome Instruments, US. As a particular example, the test method is as follows: taking from 8.000 g to 15.000 g of positive electrode active material in a weighed empty sample tube, stirring and weighing the positive electrode active material, and putting the sample tube into the NOVA 2000e degassing station for degassing, weighing total mass of the positive electrode active material and sample tube after degassing, and calculating mass of the positive electrode active material after degassing by subtracting mass of the empty sample tube from the total mass G. Putting the sample tube into NOVA 2000e, measuring the adsorption amount of nitrogen on the surface of the positive electrode active material under different relative pressures, and calculating the monolayer adsorption amount based on the Brunauer-Emmett-Teller multilayer adsorption theory and equation, and then calculating total surface area A of positive electrode active material and the specific surface area of the positive electrode active material by A/G.

The tap density of the positive electrode active material has well-known meaning in the art, and can be measured with well-known instruments and methods in the art, for example can be conveniently measured by using a tap density meter (such as FZS4-4B type).

The compaction density of the positive electrode active material has well-known meaning in the art, and can be measured with well-known instruments and methods in the art, for example, can be conveniently measured by using an electronic pressure tester (such as UTM7305 type).

Next, a method for preparing a positive electrode active material is schematically illustrated. According to such method, any one of the above-mentioned positive electrode active materials can be prepared. An exemplary preparation method includes:

Mixing the positive electrode active material precursor, the lithium source, and the doping element precursor, and sintering to obtain the positive electrode active material.

The foregoing positive electrode active material precursor may be one or more of oxides, hydroxides and carbonates containing Ni and optionally Co and/or Mn in a stoichiometric ratio, for example, hydroxides containing Ni, Co and Mn in a stoichiometric ratio.

The positive electrode active material precursor can be obtained by methods known in the art, for example, prepared by a co-precipitation method, a gel method, or a solid phase method.

As an example, Ni source, Co source and Mn source are dispersed in a solvent to obtain a mixed solution; in a continuous co-current reaction, the mixed solution, strong base solution and complexing agent solution are pumped into a stirred reactor at the same time while controlling pH value of reaction solution in a range of from 10 to 13 and temperature in the reactor in a range of from 25° C. to 90° C., under inert gas protection during reaction; after completion of the reaction and upon aging, filtering, washing and vacuum drying, hydroxide containing Ni, Co and Mn is obtained.

Ni source may be a soluble nickel salt, such as one or more of nickel sulfate, nickel nitrate, nickel chloride, nickel oxalate, and nickel acetate; as further examples, one or more of nickel sulfate and nickel nitrate; as a further example, nickel sulfate. Co source may be a soluble cobalt salt, such as one or more of cobalt sulfate, cobalt nitrate, cobalt chloride, cobalt oxalate and cobalt acetate; as further examples, one or more of cobalt sulfate and cobalt nitrate; as a further example, cobalt sulfate. Mn source may be a soluble manganese salt, such as one or more of manganese sulfate, manganese nitrate, manganese chloride, manganese oxalate, and manganese acetate; as further examples, one or more of manganese sulfate and manganese nitrate; as a further example, manganese sulfate.

The strong base may be one or more of LiOH, NaOH, and KOH, for example, NaOH. The complexing agent may be one or more of ammonia, ammonium sulfate, ammonium nitrate, ammonium chloride, ammonium citrate, and disodium ethylenediaminetetraacetic acid (EDTA), for example, ammonia.

There are no special restrictions on the solvents of the mixed solution, the strong base solution and the complexing agent solution. For example, the solvents of the mixed solution, the strong base solution and the complexing agent solution are each independently one or more of deionized water, methanol, ethanol, acetone, isopropyl alcohol and n-hexanol; such as deionized water.

The inert gas introduced during the reaction is, for example, one or more of nitrogen, argon, and helium.

The above lithium source may be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$) and lithium nitrate ($LiNO_3$). Further, the lithium source is one or more of lithium carbonate, lithium hydroxide, and lithium nitrate; further, the lithium source is lithium carbonate.

The above doping element precursor may be one or more of oxides, nitric acid compounds, carbonic acid compounds, hydroxide compounds, and acetic acid compounds of doping elements. For example, the doping element precursor may be oxides of doping elements, such as one or more of titanium oxide (such as $TiO_2$, TiO), vanadium oxide (such as $V_2O_5$, $V_2O_4$, $V_2O_3$), selenium oxide (such as $SeO_2$), zirconia (such as $ZrO_2$), niobium oxide (such as $Nb_2O_5$, $NbO_2$), ruthenium oxide (such as $RuO_2$), palladium oxide (such as PdO), antimony oxide (such as $Sb_2O_5$, $Sb_2O_3$), tellurium oxide (such as $TeO_2$) and tungsten oxide (such as $WO_2$, $WO_3$).

The doping element precursor may contain a doping element having low valence state, so that when the obtained positive electrode active material is in 78% delithiation state, the doping element M has two or more different valence states. Herein, "low valence state" means that the chemical valence of the doping element is lower than its highest stable valence state.

Positive electrode active material precursor, lithium source and doping element precursor may be mixed by using a ball mill mixer or a high-speed mixer. The mixed materials are put into an atmosphere sintering furnace for sintering. The sintering atmosphere is an oxygen-containing atmosphere, for example, an air atmosphere or an oxygen atmosphere. Optionally, the oxygen-containing atmosphere has an oxygen concentration of from 80% to 100%; The temperature for sintering is, for example, from 600° C. to 1000° C. Optionally, the sintering temperature is from 600° C. to 900° C., or even from 700° C. to 900° C., which is beneficial to making the dopant elements have a higher uniformity of distribution. The time for sintering may be adjusted according to the actual situation, for example, from 5 h to 25 h, and for example, from 10 h to 20 h.

It should be noted that during the preparation of the positive electrode active material, there are a variety of theoretically feasible ways to control the structure and characteristics of the positive electrode active material, to adjust the regularity of its layered structure and the position and uniformity of the doping elements, and to change the activity of surface oxygen and average valence state during cycling, including for example, adjusting type of doping element, content of doping element, morphology of particles of the positive electrode active material precursor, time for sintering in the preparation of the positive electrode active material, temperature for sintering, and number of sintering treatments and oxygen concentration during sintering, etc. In this application, some measures for solid-phase sintering and doping methods are listed. By adjusting the number of sintering, doping in batches, controlling the overall time for sintering and temperature for sintering, etc., the obtained positive electrode active material in 78% delithiation state has average valence state of surface oxygen $V_O$ of $-2.0 \le V_O \le -1.5$. It should be understood that the methods described in the present description are merely used to illustrate the present application, but not intended to limit the present application.

As an example, the doping element precursor may be divided into L batches for doping of the doping element, where L may be from 1 to 5, such as from 2 to 3. In these embodiments, the method for preparing the positive electrode active material may comprise the following steps: mixing positive electrode active material precursor, lithium source and first batch of doping element precursor, followed by first sintering process; mixing the product obtained from the first sintering process with second batch of doping element precursor, followed by second sintering process; and so on, until the product obtained from L–1 sintering process is mixed with the L batch of doping element precursor, followed by L-th sintering process, to obtain a positive electrode active material.

The doping element precursor may be equally or arbitrarily divided into L parts to perform L batches of doping.

The temperature for each of sintering processes may be the same or different. The time for each of sintering processes may be the same or different. Those skilled in the art can adjust the temperature and time for sintering according to type and amount of doping elements. For example, the temperature of each of sintering processes may be from 600° C. to 1000° C., such as from 600° C. to 900° C., and then from 700° C. to 900° C.; the time of each of sintering processes may be from 1 h to 20 h, such as from 2 h to 18 h; The total time for sintering may be from 5 h to 25 h, such as from 10 h to 20 h.

During the doping process, for example, the temperature and/or the time for sintering may be increased within a certain range to improve the doping uniformity.

In some embodiments, the sintered product may also be crushed and sieved to obtain a positive electrode active material with optimized particle size distribution and specific surface area. There are no special restrictions on the crushing method, which can be determined according to actual needs, such as using a particle crusher.

Positive Electrode Plate

This application provides a positive electrode plate, comprising any one or more of the positive electrode active materials of this application.

By using the positive electrode active material of the present application in the positive electrode plate of embodiments of the present application, lithium-ion secondary battery can simultaneously have good room-temperature and high-temperature cycling performance and higher energy density.

In particular, the positive electrode plate includes a positive current collector and a positive electrode active material layer disposed on at least one surface of the positive current collector. For example, the positive current collector has two opposite surfaces in its own thickness direction, and the positive electrode active material layer is laminated on either or both of the two opposite surfaces of the positive current collector.

The positive electrode active material layer includes the positive electrode active material of the present application.

In addition, the positive electrode active material layer may further include a conductive agent and a binder. In this application, there are no special restrictions on the types of conductive agents and binders in the positive active material layer, which can be determined according to actual needs.

As an example, the conductive agent may be one or more of graphite, superconducting carbon, acetylene black, carbon black, Ketjen black, carbon dots, carbon nanotubes, graphene, and carbon nanofibers; the binder may be one or more of styrene butadiene rubber (SBR), water-based acrylic resin, carboxymethyl cellulose (CMC), polyvinylidene difluoride (PVDF), polytetrafluoroethylene (PTFE), polyvinyl butyral (PVB), ethylene-vinyl acetate copolymer (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylic resin and polyvinyl alcohol (PVA).

The positive current collector may be a metal foil or porous metal plate with good electrical conductivity and mechanics properties, and the material of the positive current collector may be one or more of aluminum, copper, nickel, titanium, silver, and their respective alloys. The positive current collector is, for example, aluminum foil.

The positive electrode plate can be prepared according to the conventional method in the art. For example, a positive electrode active material, a conductive agent, and a binder are dispersed in a solvent, which may be such as N-methylpyrrolidone (NMP) or deionized water, to form a uniform positive electrode slurry; the positive electrode slurry is coated on a positive current collector; after processes including drying and rolling, a positive electrode plate is obtained.

Lithium-Ion Secondary Battery

The present application provides a lithium-ion secondary battery, comprising a positive electrode plate, a negative electrode plate, a separator and an electrolyte, wherein the positive electrode plate is any positive electrode plate of the application.

By using the positive electrode plate of the present application, the lithium-ion secondary battery can have good room-temperature and high-temperature cycling performance and high energy density at the same time.

The negative electrode plate may be a metal lithium plate.

The negative electrode plate may also comprise a negative current collector and a negative electrode active material layer disposed on at least one surface of the negative current collector. For example, the negative current collector has two opposite surfaces in its own thickness direction, and the negative electrode active material layer is laminated on either or both of the two opposite surfaces of the negative current collector.

The negative electrode active material layer includes the negative electrode active material of the present application. In the embodiments of the present application, there are no special restrictions on types of negative electrode active materials, which can be determined according to actual needs. As an example, the negative electrode active material may be one or more of natural graphite, artificial graphite, mesophase micro-carbon spheres (MCMB), hard carbon, soft carbon, silicon, silicon-carbon composite, $SiO_m$ (0<m<2, such as m=1), Li—Sn alloy, Li—Sn—O alloy, Sn, SnO, $SnO_2$, lithium titanate $Li_4Ti_5O_{12}$ with spinel structure, Li—Al alloy and metallic lithium.

The negative electrode active material layer may further include a conductive agent and a binder. In the embodiments of the present application, there are no specific restrictions on the types of conductive agents and binders in the negative electrode active material layer, which can be determined according to actual needs. As an example, the conductive agent is one or more of graphite, superconducting carbon, acetylene black, carbon black, Ketjen black, carbon dots, carbon nanotubes, graphene, and carbon nanofibers. The binders may be one or more of styrene butadiene rubber (SBR), polyvinylidene difluoride (PVDF), polytetrafluoroethylene (PTFE), polyvinyl butyral (PVB), and water-based acrylic resin.

The negative electrode active material layer may also optionally include a thickener, such as sodium carboxymethyl cellulose (CMC-Na).

The negative current collector may be a metal foil or porous metal plate with good electrical conductivity and mechanics properties, and the material of the negative current collector may be one or more of copper, nickel, titanium, iron, and their respective alloys. The negative current collector is, for example, copper foil.

The negative electrode plate can be prepared according to conventional methods in the art. For example, a negative electrode active material, a conductive agent, a binder and thickener are dispersed in a solvent, which may be such as N-methylpyrrolidone (NMP) or deionized water, to form a uniform negative electrode slurry; the negative electrode slurry is coated on a negative current collector; after processes including drying and rolling, a negative electrode plate is obtained.

In the lithium-ion secondary battery of embodiments of the present application, the electrolyte may be a solid electrolyte, such as a polymer electrolyte, an inorganic solid electrolyte, but it is not limited thereto. Electrolyte can also be used as the electrolyte solution. The above-mentioned electrolytic solution may comprise a solvent and a lithium salt dissolved in the solvent.

The solvent may be non-aqueous organic solvent, such as one or more, for example two or more, of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB), and ethyl butyrate (EB).

The lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium bisoxalate borate), $LiPO_2F_2$ (lithium difluorophosphate), LiDFOP (lithium difluorooxalate phosphate) and LiTFOP (lithium tetrafluorooxalate phosphate), such as one or more of $LiPF_6$ (lithium hexafluorophosphate), $LiBF_4$ (lithium tetrafluoroborate), LiBOB (lithium bisoxalate borate), LiDFOB (lithium difluorooxalate borate), LiTFSI (lithium bistrifluoromethanesulfonimide) and LiFSI (lithium bisfluorosulfonimide).

The electrolyte solution may also optionally contain other additives, such as one or more of vinylene carbonate (VC), vinyl ethylene carbonate (VEC), fluoroethylene carbonate (FEC), difluoroethylene carbonate (DFEC), trifluoropropylene carbonate (TFPC), succinonitrile (SN), adiponitrile (ADN), glutaronitrile (GLN), hexanetrinitrile (HTN), 1,3-propane sultone (1,3-PS), ethylene sulfate (or 1,3,2-Dioxathiolane-2,2-dioxide, DTD), methylene methanedisulfonate (MMDS), 1-propene-1,3-sultone (PST), 4-methylvinyl sulfate (PCS, or propane 1,2-cyclic sulfate), 4-ethylvinyl sulfate (PES), 4-propyl ethylene sulfate (PEGLST), propylene sulfate (TS), 1,4-butane sultone (1,4-BS), ethylene sulfite (DTO), dimethyl sulfite (DMS), diethyl sulfite (DES), sulfonic ester cyclic quaternary ammonium salt, tris(trimethylsilane) phosphate (TMSP) and tris(trimethylsilane)borate (TMSB), but not limited thereto.

There are no specific restrictions on the separator in the lithium-ion secondary battery of the embodiments of the present application, and any well-known porous structure separator with electrochemical stability and mechanical stability may be used, such as one or more of single-layer or multi-layer films of glass fiber, non-woven fabric, polyethylene (PE), polypropylene (PP) and polyvinylidene fluoride (PVDF).

The positive electrode plate and the negative electrode plate each are alternately stacked, and the separator is disposed between the positive electrode plate and the negative electrode plate to separate the positive electrode plate from the negative electrode plate, thereby forming an electrode assembly, optionally after winding. The electrode assembly is placed in a case in which the electrolyte is injected, and then the case is sealed, thereby obtaining a lithium-ion secondary battery.

Figure 5:
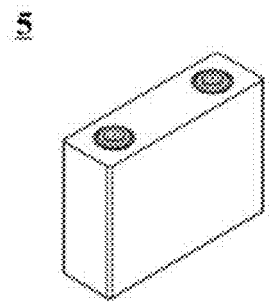
FIG. 5 is a schematic diagram of a lithium-ion secondary battery according to an embodiment of the present application.

The shape of the lithium-ion secondary battery is not particularly limited in the present application, and may be cylindrical, rectangular, or any other shape. FIG. 5 illustrates a lithium-ion secondary battery 5 having a rectangular structure as an example.

In some embodiments, the secondary battery may include an outer package. The outer package is used to encapsulate the positive electrode plate, the negative electrode plate and the electrolyte.

Figure 6:
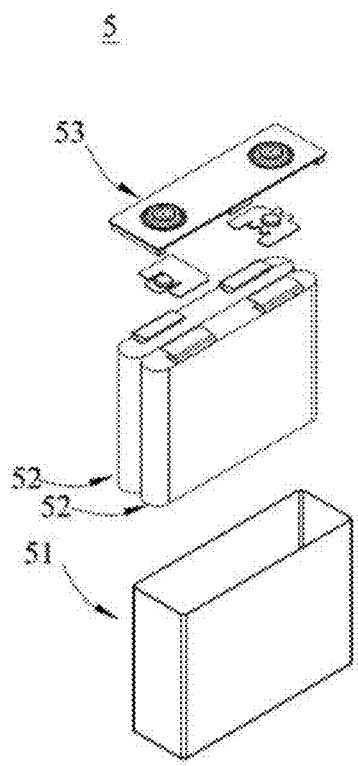
FIG. 6 is an exploded view of FIG. 5.

In some embodiments, referring to FIG. 6, the outer package may include a housing 51 and a cover plate 53. In an example, the housing 51 may include a base plate and a side plate connected to the base plate, and the base plate and the side plate are combined to form an accommodating cavity. The housing 51 has an opening communicating with the accommodating cavity, and the cover plate 53 can cover the opening to close the accommodating cavity.

The positive electrode plate, the negative electrode plate, and the separator may be stacked or laminated into an electrode assembly 52. The electrode assembly 52 is encapsulated in the accommodating cavity. The electrolyte may be an electrolytic solution, and the electrolytic solution is infiltrated in the electrode assembly 52. The number of electrode assembly 52 contained in the lithium-ion secondary battery 5 can be one or several, which can be adjusted according to requirements.

In some embodiments, the outer package of the lithium-ion secondary battery can be a hard shell, such as a hard plastic shell, aluminum shell, steel shell, or the like. The outer package of the secondary battery may also be a soft package, such as a bag. The material of the soft package may be plastic, for example, including one or more of polypropylene (PP), polybutylene terephthalate (PBT), polybutylene succinate (PBS), and the like.

In some embodiments, the lithium-ion secondary battery can be assembled into a battery module. The battery module may include a plurality of lithium-ion secondary batteries, and the specific number can be adjusted according to the application and capacity of the battery module.

Figure 7:
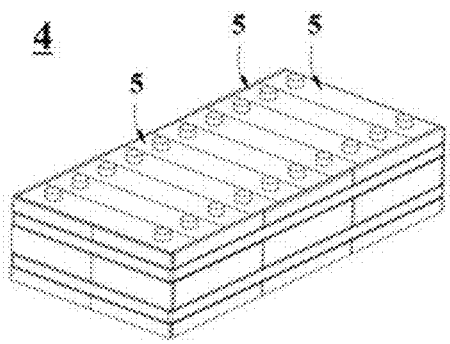
FIG. 7 is a schematic diagram of a battery module according to an embodiment of the present application.

FIG. 7 shows a battery module 4 as an example. Referring to FIG. 7, in the battery module 4, a plurality of lithium-ion secondary batteries 5 are sequentially arranged along the length direction of the battery module 4. Apparently, the secondary batteries 5 may also be disposed in any other manner. Further, a plurality of lithium-ion secondary batteries 5 can be fixed by a fastener.

Optionally, the battery module 4 may further include a casing having a receiving space, in which a plurality of lithium-ion secondary batteries 5 are received.

In some embodiments, the above-mentioned battery module may also be assembled into a battery pack, and the number of battery modules contained in the battery pack can be adjusted according to the application and capacity of the battery pack.

Figure 8:
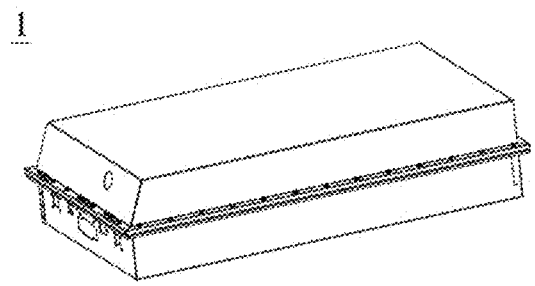
FIG. 8 is a schematic diagram of a battery pack according to an embodiment of the present application.
Figure 9:
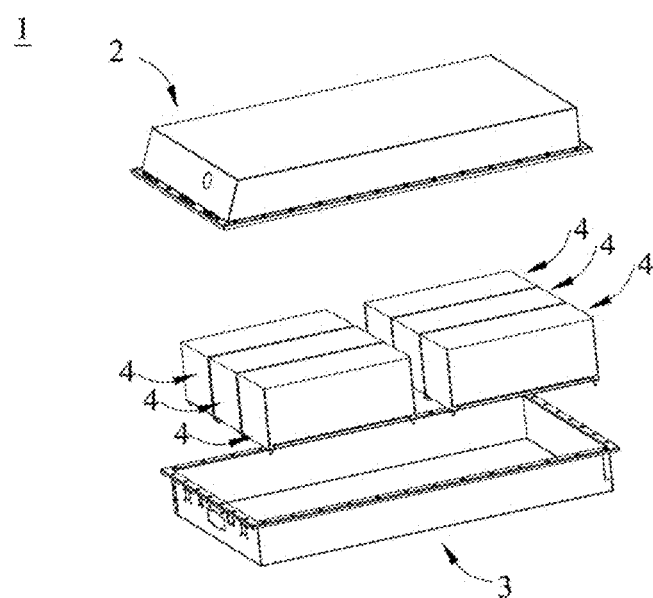
FIG. 9 is an exploded view of FIG. 8.

FIGS. 8 and 9 show a battery pack 1 as an example. With reference to FIGS. 8 and 9, the battery pack 1 may include a battery case and a plurality of battery modules 4 placed in the battery case. The battery case comprises an upper battery box 2 and a lower battery box 3. The upper battery box 2 can cover the lower battery box 3 to form a closed space for receiving the battery modules 4. A plurality of battery modules 4 can be disposed in the battery case in any manner.

The present application also provides an apparatus, the apparatus including at least one of the lithium-ion secondary battery, battery module or battery pack according to the present application. The lithium-ion secondary battery, battery module or battery pack may be used as a power source of the apparatus or as an energy storage unit of the apparatus. The apparatus may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus can adopt a lithium-ion secondary battery, a battery module, or a battery pack, according to application requirements.

Figure 10:
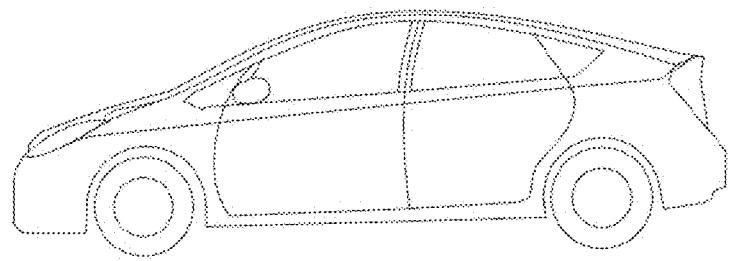
FIG. 10 is a schematic diagram of an apparatus according to an embodiment of the present application in which the lithium-ion secondary battery is used as a power source.

FIG. 10 shows an apparatus as an example. The apparatus is a pure electric vehicle, a hybrid electric vehicle, or a plug-in hybrid electric vehicle. In order to meet the requirements of the device for high power and high energy density of secondary batteries, the battery pack or battery module can be used.

As another example, the apparatus may be a mobile phone, a tablet computer, a notebook computer, etc. The apparatus is generally required to be thin and light, and a lithium-ion secondary battery can be used as a power source.

Some exemplary embodiments of the present invention are provided as follows.

Embodiment 1. A positive electrode active material, comprising a nickel-containing lithium composite oxide, and the nickel-containing lithium composite oxide satisfies the chemical formula $Li_{1+a}[Ni_xCo_yMn_zM_b]O_2$ in which M is a doping element at transition metal site, $0.5 \leq x < 1$, $0 \leq y < 0.3$, $0 \leq z < 0.3$, $-0.1 \leq a < 0.2$, $0 < b < 0.3$, $x+y+z+b=1$; wherein, the positive electrode active material has a layered crystal structure and belongs to space group $R\bar{3}m$;

under the condition that the positive electrode active material is in 78% delithiation state, at least part of the doping elements M have a chemical valence of +3 or more, and surface oxygen of the positive electrode active material has an average valence state of $V_O$ satisfying $-2.0 \leq V_O \leq -1.5$.

Embodiment 2. The positive electrode active material according to Embodiment 1, wherein the positive electrode active material comprises secondary particles aggregated from primary particles, and relative deviation of local mass concentration of the doping element M in the secondary particles is 32% or less, and optionally 20% or less.

Embodiment 3. The positive electrode active material according to Embodiment 1 or 2, wherein the positive electrode active material in 78% delithiation state has a bulk structure with oxygen defect formation energy $\Delta E_{O\text{-}vac}$ satisfying: $\Delta E_{O\text{-}vac} \leq 0.5$ eV; optionally, $\Delta E_{O\text{-}vac} \geq 0.7$ eV; optionally, $\Delta E_{O\text{-}vac} \geq 1.0$ eV.

Embodiment 4. The positive electrode active material according to any one of Embodiments 1 to 3, wherein under the condition that the positive electrode active material is in 78% delithiation state, the doping element M has two or more different valence states, and the doping element M in the highest valence state has a chemical valence being one or more of +4, +5, +6, +7, and +8; optionally one or more of +5, +6, +7, and +8.

Embodiment 5. The positive electrode active material according to any one of Embodiments 1 to 4, wherein the doping element M comprises one or more of Ti, V, Se, Zr, Nb, Ru, Pd, Sb, Te, and W; optionally, the doping element M comprises one or more of Ti, Se, Zr, Nb, Ru, Sb, Te, and W.

Embodiment 6. The positive electrode active material according to any one of Embodiments 1 to 5, wherein the positive electrode active material has a true doping concentration w satisfying $2300 \,\mu g/cm^3 \leq \omega \leq 49100 \,\mu g/cm^3$, optionally $3000 \,\mu g/cm^3 \leq \omega \leq 30000 \,\mu g/cm^3$, optionally $14830 \,\mu g/cm^3 \leq \omega \leq 49080 \,\mu g/cm^3$, optionally $24890 \,\mu g/cm^3 \leq \omega \leq 31210 \,\mu g/cm^3$.

Embodiment 7. The positive electrode active material according to any one of Embodiments 1 to 6, wherein a deviation ε of mass concentration of the doping element M in the positive electrode active material relative to average mass concentration of the doping element M in particles of the positive electrode active material satisfies $\varepsilon < 50\%$; optionally, $\varepsilon \leq 30\%$; and optionally, $\varepsilon \leq 20\%$.

Embodiment 8. The positive electrode active material according to any one of Embodiments 1 to 7, wherein the positive electrode active material has a true density $\rho_{true}$ satisfying $4.6 \text{ g/cm}^3 \leq \rho_{true} \leq 4.9 \text{ g/cm}^3$.

Embodiment 9. The positive electrode active material according to any one of Embodiments 1 to 8, wherein the positive electrode active material also satisfies one or more of the following (1) to (4):
(1) the positive electrode active material has a volume average particle diameter $D_v50$ of from 5 μm to 20 μm, optionally from 8 μm to 15 μm, and further optionally from 9 μm to 11 μm;
(2) the positive electrode active material has a specific surface area of from 0.2 m²/g to 1.5 m²/g, optionally from 0.3 m²/g to 1 m²/g;
(3) the positive electrode active material has a tap density of from 2.3 g/cm³ to 2.8 g/cm³;
(4) the positive electrode active material has a compaction density under a pressure of 5 tons (equivalent to 49 kN) of from 3.1 g/cm³ to 3.8 g/cm³.

Embodiment 10. The positive electrode active material according to any one of Embodiments 1 to 9, wherein $0.7 \leq x \leq 0.9$, $0 < y < 0.3$, $0 < z < 0.3$;
the average valence state of surface oxygen $V_O$ of the positive electrode active material in 78% delithiation state is $-1.9 \leq V_O \leq -1.6$.

Embodiment 11. A method for preparing a positive electrode active material, comprising the following steps:
mixing a positive electrode active material precursor, a lithium source and a doping element precursor to obtain a mixed material, wherein the positive electrode active material precursor is selected from one or more of hydroxides, carbonates and oxides containing Ni, optional Co and optional Mn;

sintering the mixed material in an oxygen-containing atmosphere at a temperature of from 600° C. to 1000° C., to obtain the positive electrode active material;

wherein, the positive electrode active material includes a nickel-containing lithium composite oxide, and the nickel-containing lithium composite oxide satisfies the chemical formula $Li_{1+a}[Ni_xCo_yMn_zM_b]O_2$ in which M is a doping element at transition metal site, $0.5 \leq x < 1$, $0 \leq y < 0.3$, $0 \leq z < 0.3$, $-0.1 \leq a < 0.2$, $0 < b < 0.3$, $x+y+z+b=1$;

the positive electrode active material has a layered crystal structure and belongs to space group $R\bar{3}m$;

under the condition that the positive electrode active material is in 78% delithiation state, at least part of the doping elements M have a chemical valence of +3 or more, and surface oxygen of the positive electrode active material has an average valence state of $V_O$ satisfying $-2.0 \leq V_O \leq -1.5$.

Embodiment 12. The method according to Embodiment 11, wherein the doping element precursor is selected from one or more of titanium oxide, vanadium oxide, selenium oxide, zirconium oxide, niobium oxide, ruthenium oxide, palladium oxide, antimony oxide, tellurium oxide, and tungsten oxide; optionally, the doping element precursor is selected from one or more of $TiO_2$, $TiO$, $V_2O_5$, $V_2O_4$, $V_2O_3$, $SeO_2$, $ZrO_2$, $Nb_2O_5$, $NbO_2$, $RuO_2$, $PdO$, $Sb_2O_5$, $Sb_2O_3$, $TeO_2$, $WO_2$, $WO_3$.

Embodiment 13. The method according to Embodiment 11 or 12, wherein the sintering satisfies at least one of the following:

oxygen concentration of the oxygen-containing atmosphere is from 80% to 100%;

the temperature for sintering is from 600° C. to 900° C., optionally from 700° C. to 900° C.; and the time for sintering is from 5 h to 25 h, optionally from 10 h to 20 h.

Embodiment 14. The method according to any one of Embodiments 11 to 13, wherein the doping element precursor is equally or randomly divided into L parts for L batches of doping, wherein L is from 1 to 5, optionally from 2 to 3, wherein the method comprises: mixing the positive electrode active material precursor, lithium source and first batch of doping element precursor, followed by first sintering; mixing the product obtained from the first sintering with second batch of doping element precursor, followed by second sintering; and so on, until the product obtained from L-1 sintering process is mixed with the L batch of doping element precursor, followed by L-th sintering treatment, to obtain the positive electrode active material.

Embodiment 15. The method according to Embodiment 14, wherein the temperature for each sintering is from 600° C. to 1000° C., optionally from 600° C. to 900° C., and further optionally is from 700° C. to 900° C.; the time of each sintering is from 1 h to 20 h, optionally from 2 h to 18 h; total time for sintering is from 5 h to 25 h, optionally from 10 h to 20 h.

Embodiment 16. A positive electrode plate, comprising a positive current collector and a positive electrode active material layer disposed on the positive current collector, wherein the positive electrode active material layer comprises the positive electrode active material according to any one of Embodiments 1 to 10, or the positive electrode active material obtained according to the method according to any one of Embodiments 11 to 15.

Embodiment 17. A lithium-ion secondary battery, comprising the positive electrode plate according to Embodiment 16.

Embodiment 18. A battery module comprising the lithium-ion secondary battery according to Embodiment 17.

Embodiment 19. A battery pack comprising the lithium-ion secondary battery according to Embodiment 17 or the battery module according to Embodiment 18.

Embodiment 20. An apparatus comprising at least one of the lithium-ion secondary battery according to Embodiment 17, the battery module according to Embodiment 18, or the battery pack according to Embodiment 19.

EXAMPLES

The following examples are intended to describe the present application more specifically, merely for the purpose of illustration. Various modifications and variations within the scope of the present application are apparent to those skilled in the related art. Unless otherwise stated, all parts, percentages, and ratios described in the following embodiments are based on weight, and all reagents used in the embodiments are commercially available or synthesized according to conventional methods and can be directly used without further treatment, and all instruments used in the embodiments are commercially available.

Example 1

Preparation of Positive Electrode Active Material

The doping element was Sb, and the doping element precursor antimony oxide $Sb_2O_3$ was roughly equally divided into two batches for Sb doping. An exemplary preparation method includes:

The positive electrode active material precursor $[Ni_{0.8}Co_{0.1}Mn_{0.1}](OH)_2$, lithium hydroxide LiOH and the first batch of antimony oxide were added to the high-speed mixer for mixing for 1 h to obtain a mixture. The molar ratio of the positive electrode active material precursor to the lithium hydroxide Li/Me was 1.05, Me represented the total molar amount of Ni, Co, and Mn in the positive electrode active material precursor; the mixture was put into the atmosphere sintering furnace for the first sintering. The first sintering was carried out at sintering temperature of 850° C. for sintering time of 8 h, under the sintering atmosphere of an oxygen-containing atmosphere with $O_2$ concentration of 90%.

The product of the first sintering and the second batch of antimony oxide were added to the high-speed mixer for 1 h, followed by the second sintering. The second sintering was carried out at the same sintering temperature and sintering atmosphere as the first sintering, for sintering time is 12 h. The total sintering time was 20 h.

The product of the second sintering was crushed and sieved, to obtain the high-nickel ternary positive electrode active material. The antimony oxide was added in an amount so that the true doping concentration of Sb in the positive electrode active material was 25090 μg/cm³. As shown in FIG. 1, Sb was uniformly distributed within the positive electrode active material particles.

Preparation of Electrolyte Solution

EC, DEC, and DMC were mixed in a volume ratio of 1:1:1 to obtain a solvent, and then the lithium salt $LiPF_6$ was dissolved in the above solvent to obtain an electrolyte solution, in which the concentration of $LiPF_6$ was 1 mol/L.

Preparation of Button Battery

The positive electrode active material as prepared above, carbon black as a conductive and PVDF as a binder were dispersed a weight ratio of 90:5:5 in N-methylpyrrolidone (NMP) as a solvent; after being mixed uniformly, a positive electrode slurry was obtained; the positive electrode slurry was uniformly coated on an aluminum foil as the positive current collector. After drying and cold-pressing, a positive electrode plate was obtained.

In button battery case, the positive electrode plate, a separator and a metal lithium sheet were laminated in sequence, and the above-mentioned electrolyte solution was injected to assemble a button battery.

Preparation of Full Battery

The positive electrode active material as prepared above, acetylene black as a conductive agent and PVDF as a binder were dispersed at a weight ratio of 94:3:3 in NMP as a solvent; after mixing uniformly, a positive electrode slurry was obtained; the positive electrode slurry was uniformly coated on an aluminum foil as the positive current collector. After drying and cold-pressing, a positive electrode plate was obtained.

Artificial graphite and hard carbon as a negative electrode active material, acetylene black as a conductive agent, styrene butadiene rubber (SBR) as a binder and sodium carboxymethyl cellulose (CMC) as a thickener were dispersed at a weight ratio of 90:5:2:2:1 in deionized water; after being mixed uniformly, a negative electrode slurry was obtained; the negative electrode slurry was uniformly coated on the negative current collector aluminum foil. After drying and cold-pressing, a negative electrode plate was obtained.

Polyethylene (PE) porous polymer film was used as a separator. The positive electrode plate, the separator, and the negative electrode plate were laminated in sequence, to obtain a bare electrode assembly; the bare electrode assembly was placed in an outer package followed by injecting the above electrolyte solution in the outer package, and then the outer package was packaged to obtain a full battery.

Examples 2-13, Examples 16-21 and Comparative Examples 1-2

Example 1 was repeated except that: the relevant parameters in the preparation step of the positive electrode active material were changed; the type and the amount of doping elements in each batch and the sintering temperature of from 650° C. to 850° C. and the total sintering time of from 10 h to 20 h were adjusted, to obtain the positive electrode active material with predetermined doping element type, doping amount and doping uniformity, wherein Example 4 and Example 12 involved doping of several elements, while the amounts of each doping element were basically the same; and no doping element was added in Comparative Example 1; other parameters were shown in Table 1.

Examples 14-15

Example 1 was repeated except that: the doping element in Example 14 was added in a single batch, and the sintering temperature was 715° C.; the doping element in Example 15 was added in a single batch, and the sintering temperature is 670° C.; other parameters were shown in Table 1.

Examples 22-23

In Example 22, Example 1 was repeated except that: the temperature for first sintering was 810° C. and the time for first sintering was 12 h, and the temperature of the second sintering was 660° C. and the time for second sintering was 2 h, wherein the amount of the second batch of doping elements were 65%, relative to the amount of the total doping elements.

In Example 23, Example 1 was repeated except that: the temperature for first sintering was 790° C. and the time for first sintering was 7 h, and the temperature of the second sintering was 630° C. and the time for second sintering was 2 h, wherein the amount of the second batch of doping elements were 75%, relative to the amount of the total doping elements.

Examples 24-25 and Comparative Examples 3-4

Example 1 was repeated except that: in Examples 24 and 25 and Comparative Example 4, the positive electrode active material precursors were $[Ni_{0.5}Co_{0.2}Mn_{0.3}](OH)_2$, and different types of doping elements were added; in Comparative Example 3, the positive electrode active material precursor was $[Ni_{0.5}Co_{0.2}Mn_{0.3}](OH)_2$, without addition of doping elements; other parameters were shown in Table 1.

Test Section

1) Test of average valence state $V_O$ of surface oxygen of the "78% delithiation state" positive electrode active material and test of chemical valence of the doping element M At 25° C., 18 button batteries were charged at 1 C constant current to the upper limit of the charge/discharge cut-off voltage, then charged at constant voltage until the current was ≤0.05 mA, and after standing for 2 minutes, then discharged at 1 C constant current to the lower limit of charge/discharge cut-off voltage.

Subsequently, the 18 button batteries after the above charge and discharge were charged to 2.8V, 2.9V, 3.0V, 3.1V, 3.2V, 3.3V, . . . 4.0V, 4.1V, 4.2V, 4.3V, 4.4V, 4.5V (that is, the charging voltage interval was 0.1V) at a rate of 0.1 C, respectively. From each of the charged button batteries, positive electrode plate was disassembled in a drying room and taken as a sample. After weighing and recording mass of the sample, the sample was placed into a digestion tank, followed by slowly adding 10 mL of aqua regia as a digestion reagent; then the digestion tank was put into CEM-Mars5 microwave digestion instrument in which the digestion was carried out at a microwave emission frequency of 2450 Hz; the digested sample solution was transferred to a volumetric flask and shaken, and the sample was placed into the 7000DV ICP-OES sampling system available from PerkinElmer (PE) in the United States. The mass concentration of Li, O, Ni, Co, Mn and doping elements were tested on positive electrode active material under 0.6 MPa argon pressure at 1300 W radio frequency power. Based on the mass concentrations of elements, after conversion, the chemical formula under each voltage and thus the delithiation state under each voltage were obtained. When after the ICP-OES test and calculation, the chemical formula of the positive electrode active material was $Li_{0.22}Ni_{0.8}Co_{0.1}Mn_{0.1}O_2$, the corresponding delithiation state was (1−0.22)×100%=78%, and the corresponding voltage was the voltage corresponding to the 78% delithiation state.

A battery containing positive active material to be tested was charged to the voltage corresponding to the "78% delithiation state", followed by disassembling the battery with scissors in the drying room, taking out the entire positive electrode plate and placing into a beaker and pouring an appropriate amount of high purity anhydrous dimethyl carbonate (DMC), replacing the DMC every 8 hours; after washing 3 times in succession, the sample was put into the vacuum standing box in the drying room, and pumped to vacuum state of −0.096 MPa, and dried for 12 hours; the dried positive electrode plate was used as sample in XPS test.

The plate sample was pasted on the sample stage of AXIS Supra XPS from Kratos by using 3M insulating tape. After automatic sample injection, the system was vacuum pumped for at least 1 hour. A monochromatic Al target (Al Kα, 1486.6 eV) was used as excitation source, full spectrum was scanned with a step length of 1 eV and a pass energy of 160 eV, and fine spectra of oxygen and of doping elements were scanned with a step length of 0.1 eV and a pass energy of 40 eV. XPSpeak peak splitting software was used for charging correction with $C_{1s}$ binding energy of 284.8 eV. For the photoelectron peaks of p, d, and f energy levels, peak intensity ratios of the split peak were as follows: $p_{1/2}:p_{3/2}=1:2$, $d_{3/2}:d_{5/2}=2:3$, $f_{5/2}:f_{7/2}=3:4$. Valence state of element was determined by splitting peak of specific elements with reference to the standard XPS characteristic peaks.

2) Test of oxygen defect formation energy $\Delta E_{O\text{-}vac}$ of positive electrode active material in "78% delithiation state"

(1) According to X-ray diffraction analysis general rules in HS K0131-1996, using BRUKER D8 DISCOVER X-ray diffractometer with $CuK_\alpha$ ray as the radiation source, ray wavelength λ=1.5406 Å, the scanning 2θ angle range of from 15° to 70° and scanning rate of 4°/min, XRD analysis was performed on the positive electrode active material in "78% delithiation state". Based on XRD analysis results, unit cell parameters, element occupancy and other information of the positive electrode active material in the "78% delithiation state" were obtained; based on these, a bulk structure model of the positive electrode active material with a complete structure in the "78% delithiation state" was constructed, wherein its structure satisfies space group R$\bar{3}$m; first-principles calculation software VASP based on Density Functional Theory and GGA+U exchange-correlation functional were used for structural optimization of the model until energy convergence was reached; the optimized structure energy was extracted and denoted as $E_{pristine}$.

(2) On the basis of the optimized bulk structure model of positive electrode active material in "78% delithiation state", one oxygen atom was subtracted to obtain a bulk model of the positive electrode active material with oxygen defects in "78% delithiation state"; the first-principles calculation software VASP based on Density Functional Theory and the GGA+U exchange-correlation functional were used to optimize the structure of the model of oxygen defect-containing bulk until energy convergence was reached; and the optimized structure energy was extracted and denoted as $E_{defect}$.

(3) The first-principles calculation software VASP based on Density Functional Theory and GGA+U exchange-correlation functional were used to optimize oxygen molecules until energy convergence was reached; the optimized oxygen energy was extracted and divided by 2. The result was denoted as $E_O$.

(4) The values of $E_{pristine}$, $E_{defect}$ and $E_O$ were substituted into the aforementioned Formula (1), and the oxygen defect formation energy of one oxygen atom was calculated.

Referring to (2), the defect formation energy of different oxygen atoms was obtained by subtracting different oxygen atoms, and the minimum value was used as the oxygen defect formation energy $\Delta E_{O\text{-}vac}$ of bulk structure of the positive electrode active material in "78% delithiation state".

In steps (1), (2), and (3), the accuracy of each parameter was equal to or higher than the following parameters:

| Serial number | Parameter | Accuracy |
| --- | --- | --- |
| 1 | K-point sampling in inverted space (KPOINTS) | 3 × 3 × 2 |
| 2 | Plane-wave Energy cut-off (ENCUT) | 520 eV |
| 3 | Energy convergence criterion (EDIFF) | $10^{-6}$ eV |
| 4 | Force convergence criterion (EDIFFG) | −0.005 eV/Å |
| 5 | Gaussian broadening (SIGMA) | 0.05 eV |
| 6 | Time step POTIM | 0.2 fs |

Figure 2:
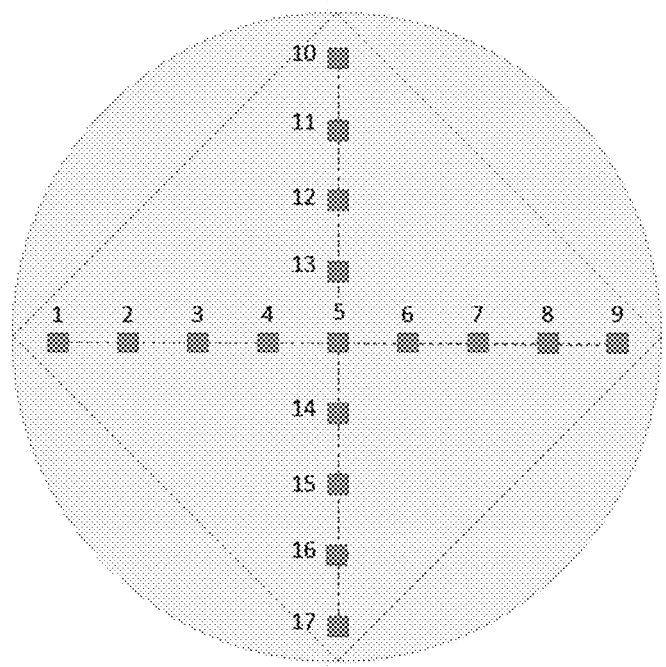
FIG. 2 is a schematic diagram showing locations taken for testing relative deviation of local mass concentration of doping elements in secondary particles of positive electrode active materials of Examples 1-25 and Comparative Examples 1-4.
Figure 3:
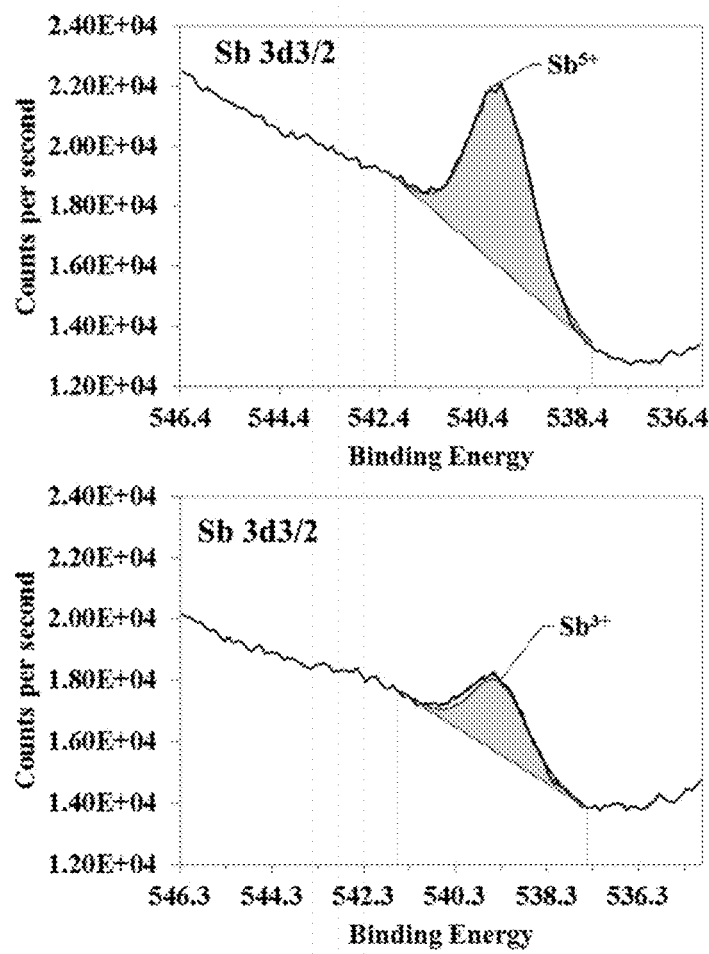
FIG. 3 is an X-ray photoelectron spectroscopy (XPS) spectrum of the positive electrode active material of Example 1 of Sb 3d orbital in 78% delithiation state.
Figure 4:
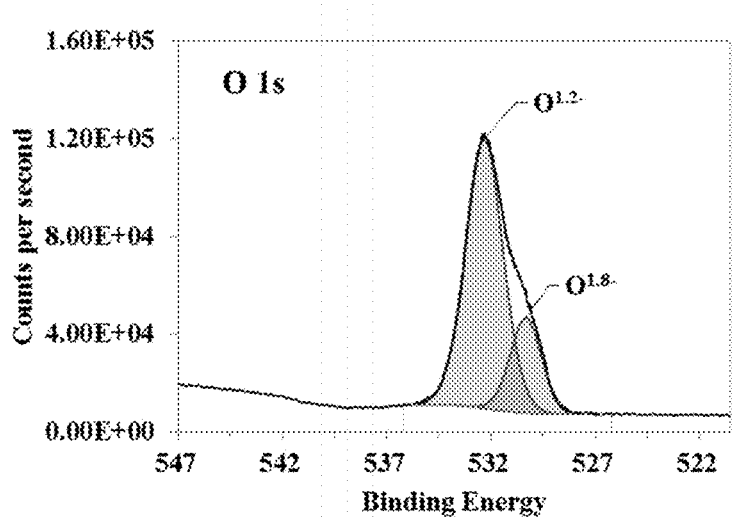
FIG. 4 is an XPS spectrum of O 1s orbital in 78% delithiation state of the positive electrode active material of Example 1.

3) Test of the relative deviation σ of local mass concentration of doping elements in secondary particles (1) Test of the Mass Concentration of Doping Elements at Different Locations in Secondary Particles 2 g of positive electrode active material powder sample was weighed, and evenly sprinkled on the sample stage with conductive adhesive, followed by lightly pressing to fix the powder; or, 1 cm×1 cm electrode plate was cut out from the positive electrode plate of battery and pasted on the sample stage, as the sample to be tested. The sample stage was put into vacuum sample chamber and fixed, the IB-09010CP type argon ion cross-section polisher manufactured by JEOL was used to prepare cross-section of the secondary particles. As shown in FIG. 2, points were taken at 17 positions in the secondary particle cross section, with each point having an area of 20 nm×20 nm. X-Max energy spectrometer (EDS) detector from Oxford Instruments Group in United Kingdom was used in combination with Sigma-02-33 type scanning electron microscope (SEM) from ZEISS in Germany, to test mass concentrations of doping elements at the 17 positions, by using the following test method: configuring Li, O, Ni, Co, Mn and doping elements as elements to be detected, and setting SEM parameters including 20 kV acceleration voltage, 60 μm aperture, 8.5 mm working distance, 2.335 A current, performing EDS-SEM test until the spectrum area reached 250,000 cts or more (controlled by acquisition time and acquisition rate), and collecting data to get the mass concentrations $\eta_1, \eta_2, \eta_3, \ldots, \eta_{17}$ of the doping elements at the positions.

(2) Test of Average Mass Concentration $\bar{\eta}$ of Doping Element in Secondary Particles The above-mentioned EDS-SEM test method was used, as shown in the dashed box in FIG. 2, the tested area covered all the above-mentioned points scanned in secondary particle and did not exceed the cross-section of the secondary particle.

(3) Relative deviation σ of local mass concentration of doping elements in secondary particles was calculated according to Formula (2).

4) Test of true doping concentration ω of positive electrode active material:

True density $\rho_{true}$ of positive electrode active material was measured by the TD2400 type powder true density tester from Beijing Builder Electronic Technology Co., Ltd. by using the following testing method: taking a certain mass of positive active material and placing in sample cup at 25° C., recording mass m of the positive active material; putting the sample cup containing the positive active material into test chamber of the true density meter, sealing test system, passing in inert gas with small molecular diameter such as helium or nitrogen, measuring gas pressure in the sample chamber and the expansion chamber, and then measuring true volume V of the measured material according to Bohr's law PV=nRT, and calculating the true density $\rho_{true}$ of the secondary particles by m/V. n was molar mass of gas in sample cup; R was the ideal gas constant, 8.314; T was the ambient temperature, 298.15K.

The 7000DV ICP-OES sampling system available from PerkinElmer (PE) in the United States was used to test mass concentration φ of doping elements in the positive electrode active material, by using the following testing method: taking electrode plate containing the positive electrode active material and punching into a disc with a total mass greater than 0.5 g, or taking at least 5 g of positive electrode active material powder sample, weighing and recording sample mass and putting the sample into a digestion tank, slowly adding 10 mL of aqua regia as a digestion reagent, assembling, then putting the digestion tank into the Mars5 microwave digestion instrument from American CEM company, and performing digestion at microwave emission frequency of 2450 Hz; transferring the digested sample solution to a volumetric flask and shaking, sampling and putting into the PE7000DV ICP-OES sampling system, testing mass concentration of doping elements in the positive electrode active material under 0.6 MPa argon pressure at 1300 W radio frequency power.

Then true doping concentration ω of the positive electrode active material was calculated according to the aforementioned Formula (3).

In order to test positive electrode active material in full battery, the following steps were carried out: disassembling the battery in a drying room, taking out middle part of the positive electrode plate and putting in a beaker, pouring an appropriate amount of high-purity anhydrous dimethyl carbonate DMC, and replacing the DMC every 8 hours, washing 3 times in succession, then putting the sample into the vacuum standing box of the drying room, pumping to vacuum state (−0.096 Mpa) and maintaining the vacuum state, drying for 12 hours, cutting out a sample of the electrode plate with the preset size for testing; or using a blade to scrape a predetermined mass of positive electrode active material powder as a test sample in the drying room.

5) According to the above-mentioned Formula (4), deviation ε of mass concentration φ of doping elements in the positive electrode active material relative to average mass concentration $\bar{\eta}$ of doping elements in secondary particles was calculated.

6) Test of initial gram capacity of button battery

At 25° C., button batteries were charged at 0.1 C constant current to the upper limit of the charge/discharge cut-off voltage, then charged at constant voltage until the current was 0.05 mA or smaller, and after standing for 2 minutes, they were then discharged at 0.1 C constant current to the lower limit of the charge/discharge cut-off voltage. The discharge capacity at this time was the initial gram capacity of the button battery.

7) Test of initial gram capacity of full battery

At 25° C., the battery was charged at ⅓C constant current to the upper limit of the charge/discharge cut-off voltage, then charged at constant voltage until the current was 0.05 mA or smaller, and after standing for 5 minutes, it was then discharged at ⅓ constant current to the lower limit of charge/discharge cut-off voltage. The discharge capacity at this time was the initial gram capacity of the full battery.

8) Tests of high temperature cycling performance of full battery

At 45° C., the battery was charged at 1 C constant current to the upper limit of the charge and discharge cut-off voltage, then charged at constant voltage until the current was 0.05 mA or smaller, and after standing for 5 minutes, it was then discharged at 0.1 C constant current to the lower limit of the charge/discharge cut-off voltage. This was a charge and discharge cycle, and the discharge capacity at this time was recorded as the discharge specific capacity $D_1$ at the first cycle. The battery was subjected to 400 cycles of charge and discharge tests according to the above method, and the discharge capacity at the 400th cycle was recorded.

Capacity retention rate of full battery at 45° C., 1 C/1 C 400 cycles (%)=$D_{400}/D_1 \times 100\%$ In the above test: in Examples 1-23 and Comparative Examples 1-2, the charge/discharge cut-off voltage of button battery was from 2.8V to 4.25V, and the charge/discharge cut-off voltage of full battery was from 2.8V to 4.2V; in Example 24-25 and Comparative Examples 3-4, the charge/discharge cut-off voltage of button battery was from 2.8V to 4.35V, and the charge/discharge cut-off voltage of full battery was from 2.8V to 4.3V.

The test results of Examples (Ex.) 1 to 25 and Comparative Examples (CE) 1 to 4 were shown in Tables 1 and 2.

TABLE 1

| | Doping element | | Mass ratio of batches | First sintering | | Second sintering | | ω (μg/cm³) | σ (%) | ε (%) |
|---|---|---|---|---|---|---|---|---|---|---|
| | Types | Chemical valence | | Temperature (° C.) | Time (h) | Temperature (° C.) | Time (h) | | | |
| CE 1 | / | / | / | One sintering at 850° C. for 20 h | | | | / | / | / |
| CE 2 | Zn | +2 | 45:55 | 790 | 9 | 815 | 11 | 25310 | 10 | 9 |
| Ex. 1 | Sb | +3, +5 | 50:50 | 850 | 8 | 850 | 12 | 25090 | 11 | 10 |
| Ex. 2 | Te | +4, +6 | 40:60 | 840 | 9 | 815 | 10 | 25480 | 8 | 8 |
| Ex. 3 | Nb | +3, +5 | 55:45 | 800 | 5 | 850 | 13 | 25410 | 13 | 11 |
| Ex. 4 | Zr + W | +4, +6 | 50:50 | 830 | 7 | 785 | 9 | 25190 | 9 | 12 |
| Ex. 5 | Sb | +3, +5 | 45:55 | 850 | 8 | 840 | 11 | 1470 | 6 | 10 |
| Ex. 6 | Sb | +3, +5 | 48:52 | 800 | 7 | 810 | 12 | 2310 | 11 | 11 |
| Ex. 7 | Sb | +3, +5 | 50:50 | 815 | 8 | 850 | 9 | 14830 | 13 | 10 |
| Ex. 8 | Sb | +3, +5 | 40:60 | 840 | 8 | 830 | 10 | 25210 | 9 | 12 |
| Ex. 9 | Sb | +3, +5 | 45:55 | 785 | 6 | 820 | 12 | 36690 | 16 | 10 |
| Ex. 10 | Sb | +3, +5 | 48:52 | 830 | 9 | 810 | 10 | 49080 | 8 | 9 |
| Ex. 11 | Sb | +3, +5 | 54:46 | 820 | 7 | 850 | 8 | 58100 | 7 | 10 |
| Ex. 12 | Sb + Ru + Te | +3, +8 | 45:55 | 815 | 8 | 785 | 12 | 25490 | 10 | 11 |
| Ex. 13 | Ru | +4, +8 | 55:45 | 850 | 6 | 840 | 11 | 25400 | 8 | 9 |
| Ex. 14 | Ru | +4, +8 | / | One sintering at 715° C. for 20 h | | | | 25280 | 20 | 10 |
| Ex. 15 | Ru | +4, +8 | / | One sintering at 670° C. for 20 h | | | | 25510 | 32 | 8 |
| Ex. 16 | Se | +4, +6 | 40:60 | 815 | 8 | 820 | 11 | 31110 | 12 | 11 |

TABLE 1-continued

|  | Doping element | | Mass ratio of batches | First sintering | | Second sintering | | ω (μg/cm³) | σ (%) | ε (%) |
| --- | --- | --- | --- | --- | --- | --- | --- | --- | --- | --- |
|  | Types | Chemical valence |  | Temperature (° C.) | Time (h) | Temperature (° C.) | Time (h) |  |  |  |
| Ex. 17 | Ti | +2, +4 | 48:52 | 800 | 9 | 850 | 10 | 31210 | 8 | 10 |
| Ex. 18 | Y | +3 | 50:50 | 835 | 7 | 820 | 12 | 31520 | 10 | 10 |
| Ex. 19 | W | +4, +6 | 45:55 | 785 | 8 | 815 | 9 | 25110 | 12 | 11 |
| Ex. 20 | Se | +3, +6 | 48:52 | 810 | 8 | 850 | 10 | 24890 | 11 | 9 |
| Ex. 21 | Ge | +4 | 55:45 | 840 | 6 | 830 | 11 | 25100 | 13 | 8 |
| Ex. 22 | Sb | +3, +5 | 35:65 | 810 | 12 | 660 | 2 | 25010 | 13 | 30 |
| Ex. 23 | Sb | +3, +5 | 25:75 | 790 | 7 | 630 | 2 | 25090 | 12 | 45 |
| CE 3 | / | / | / | One sintering at 830° C. for 20 h | | | | / | / | / |
| CE 4 | Y | +3 | 50:50 | 850 | 9 | 835 | 11 | 25290 | 10 | 10 |
| Ex. 24 | Sb | +3, +5 | 45:55 | 815 | 8 | 785 | 12 | 25110 | 13 | 11 |
| Ex. 25 | Ru | +4, +8 | 40:60 | 850 | 7 | 840 | 9 | 24890 | 8 | 9 |

In Table 1, the chemical valence showed the lowest and highest valence state of the doping elements; the mass ratio of batches=mass of first batch of doping element precursors: mass of second batch of doping element precursors.

TABLE 2

| | Average valence state $V_O$ of surface oxygen | $\Delta E_{O\text{-}vac}$ (eV) | Initial gram capacity of button battery (mAh/g) | Initial gram capacity of full battery (mAh/g) | Capacity retention rate of full battery at 45° C., 1 C/1 C, 400 cycles (%) |
| --- | --- | --- | --- | --- | --- |
| CE 1 | −1.2 | 0.2 | 197.2 | 189.3 | 81.65 |
| CE 2 | −1.3 | 0.3 | 200.5 | 191.1 | 83.87 |
| Ex. 1 | −1.8 | 1.3 | 207.6 | 197.3 | 93.58 |
| Ex. 2 | −1.6 | 1.2 | 206.8 | 196.9 | 91.77 |
| Ex. 3 | −1.7 | 1.2 | 206.1 | 195.8 | 91.90 |
| Ex. 4 | −1.8 | 1.4 | 207.2 | 197.2 | 91.98 |
| Ex. 5 | −1.8 | 1.0 | 201.4 | 191.2 | 83.93 |
| Ex. 6 | −1.8 | 1.1 | 202.3 | 192.4 | 85.20 |
| Ex. 7 | −1.8 | 1.1 | 206.8 | 195.5 | 91.87 |
| Ex. 8 | −1.8 | 1.3 | 207.3 | 195.9 | 93.23 |
| Ex. 9 | −1.8 | 1.0 | 206.0 | 196.2 | 92.12 |
| Ex. 10 | −1.8 | 1.1 | 204.0 | 193.9 | 90.11 |
| Ex. 11 | −1.8 | 1.1 | 201.8 | 191.6 | 84.83 |
| Ex. 12 | −1.9 | 1.4 | 207.8 | 196.5 | 94.21 |
| Ex. 13 | −1.7 | 1.2 | 206.5 | 194.9 | 91.93 |
| Ex. 14 | −1.7 | 0.6 | 201.1 | 192.8 | 85.90 |
| Ex. 15 | −1.7 | 0.2 | 198.4 | 191.7 | 84.91 |
| Ex. 16 | −1.7 | 1.6 | 207.2 | 196.3 | 93.99 |
| Ex. 17 | −1.6 | 1.7 | 206.9 | 197.1 | 93.86 |
| Ex. 18 | −1.6 | 0.2 | 201.7 | 192.3 | 85.69 |
| Ex. 19 | −1.9 | 1.6 | 206.1 | 195.7 | 91.52 |
| Ex. 20 | −1.9 | 1.6 | 207.3 | 195.9 | 92.15 |
| Ex. 21 | −1.6 | 1.7 | 203.1 | 191.5 | 85.11 |
| Ex. 22 | −1.7 | 1.1 | 205.6 | 194.1 | 91.62 |
| Ex. 23 | −1.5 | 0.9 | 203.9 | 192.8 | 89.13 |
| CE 3 | −1.3 | 0.3 | 170.9 | 165.2 | 89.76 |
| CE 4 | −1.4 | 0.4 | 172.4 | 166.1 | 91.03 |
| Ex. 24 | −1.9 | 1.7 | 176.5 | 171.3 | 93.81 |
| Ex. 25 | −1.9 | 1.6 | 176.1 | 170.5 | 93.06 |

From the comparison results of Examples 1 to 21 and Comparative Examples 1 to 2, Examples 24 to 25 and Comparative Examples 3 to 4, it can be seen that by using the positive electrode active materials comprising the doping element M at transition metal site and the doping element M having a chemical valence being +3 or more and an average valence $V_O$ of surface oxygen of the positive electrode active material in 78% delithiation state being from −2.0 to −1.5, the lithium-ion secondary batteries not only have a relatively high initial gram capacity, but also have a relatively high high-temperature cycling performance.

From the results of Examples 1 and 5 to 12, it can be seen that when the doping amount was too small, the doping element did not sufficiently improve structural stability of the positive electrode material, resulting in relatively low battery capacity and poor high-temperature cycling performance. When the doping amount exceeded 49100 μg/cm³, too much doping elements destroyed the original positive electrode structure, so the battery capacity and cycling performance at 45° C. were also worse than those of the positive active materials having real doping concentration of from 2300 μg/cm³ to 49100 μg/cm³.

From the results of Examples 13 to 15, it can be seen that when the relative deviation of the local mass concentration of the doping element in the secondary particles was less than 20%, the doping element was very uniformly distributed inside the active material, resulting in significantly improved stability of the material and correspondingly better capacity and cycling performance of electrode assembly. Conversely, when the relative deviation of the local mass concentration of the doping element in the secondary particles exceeded 20%, the lattice stress in the uneven doping area was large, resulting in the deteriorated capacity and high-temperature cycling performance of battery.

From the results of Examples 1, 22 and 23, it can be seen that when positive electrode active material satisfied ε of 30% or lower, indicating that more doping elements had been incorporated into the secondary particles, the doping elements fully provided the effects of improving structural stability of the positive electrode material, and improved capacity and high-temperature cycling performance of battery. When ε was greater than 30%, more doping elements were distributed in the gap or on the surface of secondary particles, and the doping elements have a poor effect of improving the positive electrode active material, but the doping elements distributed on the surface also provided a certain effects of coating and isolating from side reactions of electrolyte, so the capacity and high-temperature cycling performance of electrode assembly were slightly reduced.

The above mentioned descriptions only show particular implementations of the present application and but are not intended to limit the protection scope of the present application. Various equivalent modifications or replacements can be readily figured out by a person skilled in the art within the technical scope disclosed in the present application shall fall within the protection scope of the present application. Therefore, the protection scope of the present application shall be determined by the protection scope of the claims.

What is claimed is:

1. A positive electrode active material, comprising a nickel-containing lithium composite oxide, and the nickel-containing lithium composite oxide satisfies the chemical formula $Li_{1+a}[Ni_xCo_yMn_zM_b]O_2$ in which M is a doping element at transition metal site, 0.5≤x<1, 0≤y<0.3, 0≤z<0.3, −0.1≤a<0.2, 0<b<0.3, x+y+z+b=1; wherein,
   the positive electrode active material has a layered crystal structure and belongs to space group R$\overline{3}$m;
   under condition that the positive electrode active material is in 78% delithiation state, at least part of the doping elements M have a chemical valence of +3 or more, and surface oxygen of the positive electrode active material has an average valence state of $V_O$ satisfying −2.0≤$V_O$≤−1.5.

2. The positive electrode active material according to claim 1, wherein the positive electrode active material comprises secondary particles aggregated from primary particles, and relative deviation of local mass concentration of the doping element M in the secondary particles is 32% or less.

3. The positive electrode active material according to claim 1, wherein the positive electrode active material in 78% delithiation state has a bulk structure with oxygen defect formation energy $\Delta E_{O-vac}$ satisfying: $\Delta E_{O-vac}$≥0.5 eV.

4. The positive electrode active material according to claim 1, wherein under the condition that the positive electrode active material is in 78% delithiation state, the doping element M has two or more different valence states, and the doping element M in the highest valence state has a chemical valence being one or more of +4, +5, +6, +7, and +8.

5. The positive electrode active material according to claim 1, wherein the doping element M comprises one or more of Ti, V, Se, Zr, Nb, Ru, Pd, Sb, Te, and W.

6. The positive electrode active material according to claim 1, wherein the positive electrode active material has a true doping concentration ω satisfying 2300 μg/cm³≤ω≤49100 μg/cm³.

7. The positive electrode active material according to claim 1, wherein a deviation ε of mass concentration of the doping element M in the positive electrode active material relative to average mass concentration of the doping element M in particles of the positive electrode active material satisfies ε<50%.

8. The positive electrode active material according to claim 1, wherein the positive electrode active material has a true density $\rho_{true}$ satisfying 4.6 g/cm³≤$\rho_{true}$≤4.9 g/cm³.

9. The positive electrode active material according to claim 1, wherein the positive electrode active material also satisfies one or more of the following (1) to (4):
   (1) the positive electrode active material has a volume average particle diameter DV 50 of from 5 μm to 20 μm;
   (2) the positive electrode active material has a specific surface area of from 0.2 m²/g to 1.5 m²/g;
   (3) the positive electrode active material has a tap density of from 2.3 g/cm³ to 2.8 g/cm³;
   (4) the positive electrode active material has a compaction density under a pressure of 5 tons (equivalent to 49 kN) of from 3.1 g/cm³ to 3.8 g/cm³.

10. The positive electrode active material according to claim 1, wherein 0.7≤x≤0.9, 0<y<0.3, 0<z<0.3;
    the average valence state of surface oxygen $V_O$ of the positive electrode active material in 78% delithiation state is −1.9≤$V_O$≤−1.6.

11. A positive electrode plate, comprising a positive current collector and a positive electrode active material layer disposed on the positive current collector, wherein the positive electrode active material layer comprises the positive electrode active material according to claim 1.

12. A lithium-ion secondary battery, comprising the positive electrode plate according to claim 11.

13. A battery module comprising the lithium-ion secondary battery according to claim 12.

14. A battery pack comprising the lithium-ion secondary battery according to claim 12.

15. An apparatus comprising at least one of the lithium-ion secondary battery according to claim 12.

16. A method for preparing a positive electrode active material, comprising the following steps:
    mixing a positive electrode active material precursor, a lithium source and a doping element precursor to obtain a mixed material, wherein the positive electrode active material precursor is selected from one or more of hydroxides, carbonates and oxides containing Ni, optional Co and optional Mn;
    sintering the mixed material in an oxygen-containing atmosphere at a temperature of from 600° C. to 1000° C., to obtain the positive electrode active material;
    wherein, the positive electrode active material includes a nickel-containing lithium composite oxide, and the nickel-containing lithium composite oxide satisfies the chemical formula $Li_{1+a}[Ni_xCo_yMn_zM_b]O_2$ in which M is a doping element at transition metal site, 0.5≤x<1, 0≤y<0.3, 0≤z<0.3, −0.1≤a<0.2, 0<b<0.3, x+y+z+b=1;
    the positive electrode active material has a layered crystal structure and belongs to space group R$\overline{3}$m;
    under condition that the positive electrode active material is in 78% delithiation state, at least part of the doping elements M have a chemical valence of +3 or more, and surface oxygen of the positive electrode active material has an average valence state of $V_O$ satisfying −2.0≤$V_O$≤−1.5.

17. The method according to claim 16, wherein the doping element precursor is selected from one or more of titanium oxide, vanadium oxide, selenium oxide, zirconium oxide, niobium oxide, ruthenium oxide, palladium oxide, antimony oxide, tellurium oxide, and tungsten oxide.

18. The method according to claim 16, wherein the sintering satisfies at least one of the following:
- oxygen concentration of the oxygen-containing atmosphere is from 80% to 100%;
- the temperature for sintering is from 600° C. to 900° C.; and
- the time for sintering is from 5 h to 25 h.

19. The method according to claim 16, wherein the doping element precursor is equally or randomly divided into L parts for L batches of doping, wherein L is from 1 to 5, wherein the method comprises: mixing the positive electrode active material precursor, lithium source and first batch of doping element precursor, followed by first sintering; mixing the product obtained from the first sintering with second batch of doping element precursor, followed by second sintering; and so on, until the product obtained from L−1 sintering process is mixed with the L batch of doping element precursor, followed by L-th sintering treatment, to obtain the positive electrode active material.

20. The method according to claim 19, wherein the temperature for each sintering is from 600° C. to 1000° C.; the time of each sintering is from 1 h to 20 h; total time for sintering is from 5 h to 25 h.

* * * * *